(12) United States Patent
Ishizeki et al.

(10) Patent No.: US 11,577,579 B2
(45) Date of Patent: Feb. 14, 2023

(54) VEHICLE AIR-CONDITIONING DEVICE

(71) Applicant: SANDEN AUTOMOTIVE CLIMATE SYSTEMS CORPORATION, Isesaki (JP)

(72) Inventors: Tetsuya Ishizeki, Isesaki (JP); Takefumi Tomiya, Isesaki (JP); Yoshiyuki Okamoto, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 381 days.

(21) Appl. No.: 16/962,120

(22) PCT Filed: Dec. 14, 2018

(86) PCT No.: PCT/JP2018/047129
§ 371 (c)(1),
(2) Date: Jul. 14, 2020

(87) PCT Pub. No.: WO2019/150830
PCT Pub. Date: Aug. 8, 2019

(65) Prior Publication Data
US 2020/0346520 A1 Nov. 5, 2020

(30) Foreign Application Priority Data
Jan. 30, 2018 (JP) .............................. JP2018-013512

(51) Int. Cl.
*B60H 1/00* (2006.01)
*B60H 1/06* (2006.01)
*B60H 1/32* (2006.01)

(52) U.S. Cl.
CPC ..... *B60H 1/00885* (2013.01); *B60H 1/00328* (2013.01); *B60H 1/00342* (2013.01);
(Continued)

(58) Field of Classification Search
CPC ............ B60H 1/00885; B60H 1/00328; B60H 1/00342; B60H 1/00921; B60H 1/06;
(Continued)

(56) References Cited

U.S. PATENT DOCUMENTS 9,796,237 B2 * 10/2017 Miyakoshi ........... B60H 1/3207
9,796,247 B2 * 10/2017 Miyakoshi ......... B60H 1/00921
(Continued)

FOREIGN PATENT DOCUMENTS

DE 112017005756 T5 * 8/2019 ......... B60H 1/00278
DE 112019002693 T5 * 2/2021 ......... B60H 1/00328
(Continued)

OTHER PUBLICATIONS

Japan Patent Office, International Search Report issued in International Application No. PCT/JP2018/047129, dated Feb. 26, 2019.

*Primary Examiner* — Ljiljana V. Ciric
(74) *Attorney, Agent, or Firm* — Baker Botts L.L.P.

(57) ABSTRACT

A vehicle air-conditioning device includes a compressor 2, a radiator 4, an outdoor heat exchanger 7, a first heat medium circulating device 61 to let a first heat medium circulate in a heat medium heating heater 66, and a second heat medium circulating device 62 to let a second heat medium circulate in a battery 55. The first heat medium circulating device has a first heat medium heat exchanging unit 65A which exchanges heat between a refrigerant and the first heat medium. The second heat medium circulating device has a second heat medium heat exchanging unit 65B which exchanges heat between the first heat medium and the second heat medium.

20 Claims, 10 Drawing Sheets

(52) U.S. Cl.
CPC ........... B60H 1/00921 (2013.01); B60H 1/06 (2013.01); B60H 1/3227 (2013.01); B60H 1/32284 (2019.05); B60H 2001/00928 (2013.01); B60H 2001/00942 (2013.01); B60H 2001/00949 (2013.01); B60H 2001/3255 (2013.01)

(58) Field of Classification Search
CPC .............. B60H 1/3227; B60H 1/32284; B60H 2001/00928; B60H 2001/00942; B60H 2001/00949; B60H 2001/3255
See application file for complete search history.

(56) References Cited

U.S. PATENT DOCUMENTS

| | | | | |
|---|---|---|---|---|
| 9,797,641 B2 * | 10/2017 | Suzuki | ................ | F25B 47/022 |
| 9,873,307 B2 * | 1/2018 | Suzuki | ................ | F25B 40/02 |
| 9,878,595 B2 * | 1/2018 | Miyakoshi | ........ | B60H 1/00385 |
| 9,909,794 B2 * | 3/2018 | Suzuki | ............... | B60H 1/00921 |
| 9,944,151 B2 * | 4/2018 | Suzuki | ................ | F25B 41/24 |
| 9,944,256 B2 * | 4/2018 | Miyakoshi | ............... | F25B 6/04 |
| 10,040,337 B2 * | 8/2018 | Miyakoshi | ........... | B60H 1/3208 |
| 10,047,988 B2 * | 8/2018 | Miyakoshi | ............ | F25B 31/008 |
| 10,059,168 B2 * | 8/2018 | Suzuki | ................ | F25B 40/00 |
| 10,220,678 B2 * | 3/2019 | Miyakoshi | ........... | F25B 47/022 |
| 10,239,382 B2 * | 3/2019 | Miyakoshi | .............. | F25B 49/02 |
| 10,252,600 B2 * | 4/2019 | Miyakoshi | .............. | F25B 49/02 |
| 10,279,654 B2 * | 5/2019 | Miyakoshi | ............... | F25B 41/24 |
| 10,293,661 B2 * | 5/2019 | Miyakoshi | .............. | B60L 58/12 |
| 10,315,485 B2 * | 6/2019 | Miyakoshi | ......... | B60H 1/00785 |
| 10,369,864 B2 * | 8/2019 | Ishizeki | ................ | B60H 1/22 |
| 10,391,836 B2 * | 8/2019 | Suzuki | ............... | B60H 1/00921 |
| 10,421,337 B2 * | 9/2019 | Miyakoshi | ............ | B60H 1/3225 |
| 10,421,338 B2 * | 9/2019 | Suzuki | ............... | B60H 1/2221 |
| 10,427,495 B2 * | 10/2019 | Suzuki | ................ | F25B 40/00 |
| 10,500,920 B2 * | 12/2019 | Ishizeki | ................ | F25B 40/02 |
| 10,525,792 B2 * | 1/2020 | Suzuki | ................ | B60H 1/3229 |
| 10,525,794 B2 * | 1/2020 | Suzuki | ............... | B60H 1/00921 |
| 10,538,144 B2 * | 1/2020 | Suzuki | ............... | B60H 1/00921 |
| 10,562,375 B2 * | 2/2020 | Suzuki | ................ | B60H 1/321 |
| 10,611,213 B2 * | 4/2020 | Suzuki | ................ | F25B 5/04 |
| 10,625,560 B2 * | 4/2020 | Miyakoshi | ........... | B60H 1/3207 |
| 10,647,178 B2 * | 5/2020 | Suzuki | ................ | F25B 41/00 |
| 10,647,179 B2 * | 5/2020 | Suzuki | ................ | B60H 1/3213 |
| 10,703,169 B2 * | 7/2020 | Miyakoshi | ......... | B60H 1/00921 |
| 10,712,066 B2 * | 7/2020 | Miyakoshi | ............ | F25B 47/022 |
| 10,723,203 B2 * | 7/2020 | Kato | ........................ | F25B 5/04 |
| 10,766,338 B2 * | 9/2020 | Oh | ..................... | B60H 1/00899 |
| 10,843,527 B2 * | 11/2020 | Suzuki | ................ | F25B 41/24 |
| 10,899,195 B2 * | 1/2021 | Miura | ............... | B60H 1/00557 |
| 10,946,719 B2 * | 3/2021 | Suzuki | ............... | B60H 1/00385 |
| 10,953,724 B2 * | 3/2021 | Suzuki | ................ | F25B 5/02 |
| 11,007,847 B2 * | 5/2021 | Miyakoshi | ............ | B60H 1/2221 |
| 11,021,044 B2 * | 6/2021 | Suzuki | ................ | B60H 1/321 |
| 11,104,205 B2 * | 8/2021 | Ishizeki | ................. | B60H 1/143 |
| 11,192,428 B2 * | 12/2021 | Miyakoshi | ............ | B60H 1/0073 |
| 11,214,116 B2 * | 1/2022 | Kim | ........................ | B60L 1/02 |
| 11,247,533 B2 * | 2/2022 | Aoki | ....................... | F25B 41/20 |
| 11,383,583 B2 * | 7/2022 | Kozasa | ................ | F28D 7/0083 |
| 2016/0201960 A1 * | 7/2016 | Miyakoshi | ......... | B60H 1/00385 62/154 |
| 2018/0194191 A1 * | 7/2018 | Suzuki | ............... | B60H 1/00921 |
| 2018/0354342 A1 * | 12/2018 | Miyakoshi | ............ | B60H 1/3213 |
| 2019/0023100 A1 * | 1/2019 | Suzuki | ................ | F25B 6/02 |
| 2019/0353407 A1 * | 11/2019 | Miyakoshi | ............ | B60H 1/2225 |
| 2020/0122544 A1 * | 4/2020 | Ishizeki | ............. | B60H 1/00921 |
| 2021/0300146 A1 * | 9/2021 | Ishizeki | ............. | B60H 1/3205 |
| 2021/0309070 A1 * | 10/2021 | Ishizeki | ............. | B60H 1/32011 |
| 2021/0316593 A1 * | 10/2021 | Ishizeki | ............. | B60H 1/00764 |
| 2022/0134842 A1 * | 5/2022 | Ishizeki | ............. | B60H 1/00278 165/202 |

FOREIGN PATENT DOCUMENTS

| | | | | | |
|---|---|---|---|---|---|
| DE | 112016005644 B4 | * | 10/2021 | ......... | B60H 1/00899 |
| DE | 112019006489 T5 | * | 11/2021 | ............ | B60H 1/034 |
| JP | 2003-285632 A | | 10/2003 | | |
| JP | 2014-213765 A | | 11/2014 | | |
| JP | 5860360 B2 | | 2/2016 | | |
| RU | 2718206 C2 | * | 3/2020 | ......... | B60H 1/00278 |
| WO | 2017/217099 A1 | | 12/2017 | | |

* cited by examiner

VEHICLE AIR-CONDITIONING DEVICE

CROSS-REFERENCE TO RELATED APPLICATIONS

This application is a U.S. National Stage Patent Application under 35 U.S.C. § 371 of International Patent Application No. PCT/JP2018/047129, filed on Dec. 14, 2018, which claims the benefit of Japanese Patent Application No. 2018-013512, filed on Jan. 30, 2018, the disclosures of each of which are incorporated herein by reference in their entirety.

TECHNICAL FIELD

The present invention relates to an air conditioner of a heat pump system which conditions air of a vehicle interior of a vehicle, and more particularly to a vehicle air-conditioning device which is suitable for a hybrid car and an electric vehicle.

BACKGROUND ART

Due to actualization of environmental problems in recent years, hybrid cars and electric vehicles each of which drives a motor for running by power supplied from a battery have spread. Further, as an air conditioning device which is applicable to such a vehicle, there has been developed an air conditioning device which includes a refrigerant circuit to which a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let outdoor air flow and let the refrigerant absorb or radiate heat are connected, and which changes and executes a heating mode (a heating operation) to let the refrigerant discharged from the compressor radiate heat in the radiator and let the refrigerant from which the heat has been radiated in the radiator absorb heat in the outdoor heat exchanger, and a cooling mode (a cooling operation) to let the refrigerant discharged from the compressor radiate heat in the outdoor heat exchanger and let the refrigerant absorb heat in the heat absorber (refer to, for example, Patent Document 1).

On the other hand, the charge/discharge performance of the battery mounted on the vehicle is lowered under a low temperature environment. In addition, there is a risk that when the charging/discharging of the battery is performed under an environment where the temperature is high due to self-heat generation or the like, its deterioration progresses and soon the battery causes an operation failure to lead to breakage. Therefore, there has also been developed a battery in which a low water temperature loop (heat medium circulating device) that circulates cooling water (heat medium) through the battery is provided to exchange heat between a refrigerant and cooling water (heat medium) circulated in the refrigerant circuit by a chiller (refrigerant-heat medium heat exchanger), and in which the cooling water (heat medium) is heated with a hot water heater (heating device) to adjust the temperature of the battery and further heating assistance can be performed with waste heat from the battery or heating with the hot water heater (heating device) (refer to, for example, Patent Document 2).

CITATION LIST

Patent Documents

Patent Document 1: Japanese Patent Application Publication No. 2014-213765
Patent Document 2: Japanese Patent No. 5860360

SUMMARY OF THE INVENTION

Problems to be Solved by the Invention

There is however a drawback that when a heating assistance operation in which the heating assistance is performed by heating with the heating device (hot water heater) such as shown in Patent Document 2 is executed, the temperature of the battery is equal to or higher than a lower limit temperature of use, but in a situation where the temperature of the battery is lower than the temperature of the heat medium (cooling water) necessary for heating the refrigerant in the refrigerant-heat medium heat exchanger (chiller), the amount of heat generation of the heating device (hot water heater) corresponding to the heating capacity of the battery is deprived until the battery warms up, so that wasteful power is consumed.

The present invention has been made to solve such conventional technical problems, and an object thereof is to provide a vehicle air-conditioning device capable of realizing an efficient air-conditioning operation without being affected by the temperature of a heat generating device mounted on a vehicle such as a battery.

Means for Solving the Problems

A vehicle air-conditioning device of the present invention conditions air of a vehicle interior, including a compressor to compress a refrigerant, an air flow passage through which the air to be supplied to the vehicle interior flows, a radiator to let the refrigerant radiate heat, thereby heating the air to be supplied from the air flow passage to the vehicle interior, an outdoor heat exchanger provided outside the vehicle interior to let the refrigerant absorb heat, and a control device. The vehicle air-conditioning device is characterized by including a first heat medium circulating device to let a first heat medium circulate in a heating device for heating the first heat medium, and a second heat medium circulating device to let a second heat medium circulate in a heat generating device mounted on a vehicle, and in that the first heat medium circulating device has a first heat medium heat exchanging unit to let heat exchange between the refrigerant and the first heat medium, and the second heat medium circulating device has a second heat medium heat exchanging unit to let heat exchange between the first heat medium and the second heat medium.

The vehicle air-conditioning device of a particular embodiment is characterized in that in the above invention, the vehicle air-conditioning device includes a three medium heat exchanger in which the first heat medium heat exchanging unit and the second heat medium heat exchanging unit are integrated.

The vehicle air-conditioning device of a particular embodiment is characterized in that in the above respective inventions, the control device controls the respective heat medium circulating devices on the basis of the temperature of the heat generating device.

The vehicle air-conditioning device of a particular embodiment is characterized in that in the above respective inventions, the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and heats the first heat medium by the heating device to circulate the first heat medium in the first heat medium circulating device, and in that when the heat generating device needs not to be heated, the control device stops circulation of the second heat medium in the second heat medium circulating device.

The vehicle air-conditioning device of a particular embodiment is characterized in that in the above invention, when the temperature of the heat generating device is greater than or equal to a predetermined operating lower limit temperature, the control device determines that the heat generating device needs not to be heated.

The vehicle air-conditioning device of a particular embodiment is characterized in that in the above respective inventions, when it is possible to recover waste heat of the heat generating device, the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and in that the control device lets the first heat medium circulate in the first heat medium circulating device and lets the second heat medium circulate in the second heat medium circulating device.

The vehicle air-conditioning device of a particular embodiment is characterized in that in the above invention, when the temperature of the heat generating device is higher than a predetermined value of the temperature of the first heat medium on the outlet side of the first heat medium heat exchanging unit, which becomes a criterion for determining whether or not the waste heat of the heat generating device is recoverable, the control device determines the waste heat of the heat generating device to be recoverable.

The vehicle air-conditioning device of a particular embodiment is characterized in that in the above respective inventions, when the heat generating device needs to be heated, the control device heats the first heat medium by the heating device to circulate the first heat medium in the first heat medium circulating device, and circulate the second heat medium in the second heat medium circulating device.

The vehicle air-conditioning device of a particular embodiment is characterized in that in the above invention, when the temperature of the heat generating device is lower than a predetermined operating lower limit temperature, the control device determines that the heat generating device needs to be heated.

The vehicle air-conditioning device of a particular embodiment is characterized in that in the above invention, when the heat generating device needs to be cooled, the control device lets the refrigerant discharged from the compressor radiate heat in the radiator, decompresses the refrigerant from which the heat has been radiated, and then lets the refrigerant absorb heat in the first heat medium heat exchanging unit, and in that in a state in which the heating of the first heat medium by the heating device is stopped, the control device lets the first heat medium circulate in the first heat medium circulating device and lets the second heat medium circulate in the second heat medium circulating device.

The vehicle air-conditioning device of a particular embodiment is characterized in that in the above invention, when the temperature of the heat generating device is higher than a predetermined operating upper limit temperature, the control device determines that the heat generating device needs to be cooled.

Advantageous Effect of the Invention

According to the present invention, in a vehicle air-conditioning device which conditions air of a vehicle interior, including a compressor to compress a refrigerant, an air flow passage through which the air to be supplied to the vehicle interior flows, a radiator to let the refrigerant radiate heat, thereby heating the air to be supplied from the air flow passage to the vehicle interior, an outdoor heat exchanger provided outside the vehicle interior to let the refrigerant absorb heat, and a control device, the vehicle air-conditioning device includes a first heat medium circulating device to let a first heat medium circulate in a heating device for heating the first heat medium, and a second heat medium circulating device to let a second heat medium circulate in a heat generating device mounted on a vehicle, and has a first heat medium heat exchanging unit to let heat exchange between the refrigerant and the first heat medium, which is provided in the first heat medium circulating device, and a second heat medium heat exchanging unit to let heat exchange between the first heat medium and the second heat medium, which is provided in the second heat medium circulating device. Therefore, an efficient air-conditioning operation can be realized without being affected by the temperature of the heat generating device by changing a state of allowing the second heat medium to be circulated in the second heat medium circulating device and a state of allowing the second heat medium not to be circulated therein.

In particular, since the exchange of heat between the second heat medium circulated in the heat generating device and the refrigerant is made through the first heat medium heated by the heating device, it is possible to accurately eliminate or control an influence due to the temperature of the heat generating device.

Also, as in the invention of claim 2, the vehicle air-conditioning device can be disposed even in a limited installation space of a vehicle without hindrance by providing a three medium heat exchanger in which the first heat medium heat exchanging unit and the second heat medium heat exchanging unit are made integral.

Further, as in the invention of claim 3, if the control device is configured to control the respective heat medium circulating devices on the basis of the temperature of the heat generating device, the respective heat medium circulating devices can be appropriately controlled according to the state of the temperature of the heat generating device.

For example, as in the invention of claim 4, when the control device performs heating assistance of letting the refrigerant discharged from the compressor radiate heat in the radiator, decompressing the refrigerant from which the heat has been radiated, and then letting the refrigerant absorb heat in the outdoor heat exchanger and the first heat medium heat exchanging unit, and heating the first heat medium by the heating device to circulate the first heat medium in the first heat medium circulating device, the control device stops circulation of the second heat medium in the second heat medium circulating device in a situation in which the temperature of the heat generating device is low though it is not necessary to heat the heat generating device, thereby making it possible to eliminate a disadvantage that the temperature of the first heat medium heated in the heating device is lowered by heat exchange with the second heat medium reduced in temperature by the heat generating device. That is, in a situation in which upon performing the heating assistance by the heating device, the temperature of the heat generating device is low but heating is not required, it is possible to avoid in advance a disadvantage that wasteful power corresponding to a thermal capacity of the heat generating device is consumed in the heating device and to realize an efficient air-conditioning operation by the heating assistance.

In this case, for example, as in the invention of claim 5, when the temperature of the heat generating device is greater than or equal to a predetermined operating lower limit temperature, the control device determines that the heat generating device needs not to be heated. Consequently, it is possible to accurately determine that the heat generating device needs not to be heated and thereby control the respective heat medium circulating devices.

Further, as in the invention of claim 6, when it is possible to recover waste heat of the heat generating device, the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and the control device lets the first heat medium circulate in the first heat medium circulating device and lets the second heat medium circulate in the second heat medium circulating device. It is thus possible to cause the refrigerant to pump up the waste heat of the heat generating device through the second heat medium and the first heat medium sequentially and efficiently perform heating air conditioning of the vehicle interior by effectively utilizing the waste heat of the heat generating device. Further, it is possible to suppress a temperature rise of the heat generating device as well and also possible to suppress frost formation on the outdoor heat exchanger.

In this case, for example, as in the invention of claim 7, when the temperature of the heat generating device is higher than a predetermined value of the temperature of the first heat medium on the outlet side of the first heat medium heat exchanging unit, which becomes a criterion for determining whether or not the waste heat of the heat generating device is recoverable, the control device determines the waste heat of the heat generating device to be recoverable. It is thus possible to accurately determine that the waste heat of the heat generating device can be recovered and thereby control the respective heat medium circulating devices.

Incidentally, when the heat generating device needs to be heated, as in the invention of claim 8, the control device heats the first heat medium by the heating device to circulate the first heat medium in the first heat medium circulating device, and circulate the second heat medium in the second heat medium circulating device. Consequently, it is possible to heat the second heat medium by the first heat medium heated by the heating device and heat the heat generating device with the heated second heat medium without hindrance.

Even in this case, for example, as in the invention of claim 9, when the temperature of the heat generating device is lower than a predetermined operating lower limit temperature, the control device determines that the heat generating device needs to be heated. It is thus possible to accurately determine that it is necessary to heat the heat generating device and thereby control the respective heat medium circulating devices.

Further, when the heat generating device needs to be cooled, as in the invention of claim 10, the control device is configured to let the refrigerant discharged from the compressor radiate heat in the radiator, decompress the refrigerant from which the heat has been radiated, and then let the refrigerant absorb heat in the first heat medium heat exchanging unit, and in a state in which the heating of the first heat medium by the heating device is stopped, the control device is configured to let the first heat medium circulate in the first heat medium circulating device and let the second heat medium circulate in the second heat medium circulating device. It is thus possible to cool the heat generating device without hindrance by the second heat medium cooled with heat exchange with the first heat medium cooled by the refrigerant.

Even in this case, for example, as in the invention of claim 11, when the temperature of the heat generating device is higher than a predetermined operating upper limit temperature, the control device determines that the heat generating device needs to be cooled. It is thus possible to accurately determine that the heat generating device needs to be cooled and thereby control the respective heat medium circulating devices.

MODE FOR CARRYING OUT THE INVENTION

Hereinafter, description will be made as to embodiments of the present invention in detail with reference to the drawings.

Figure 1:
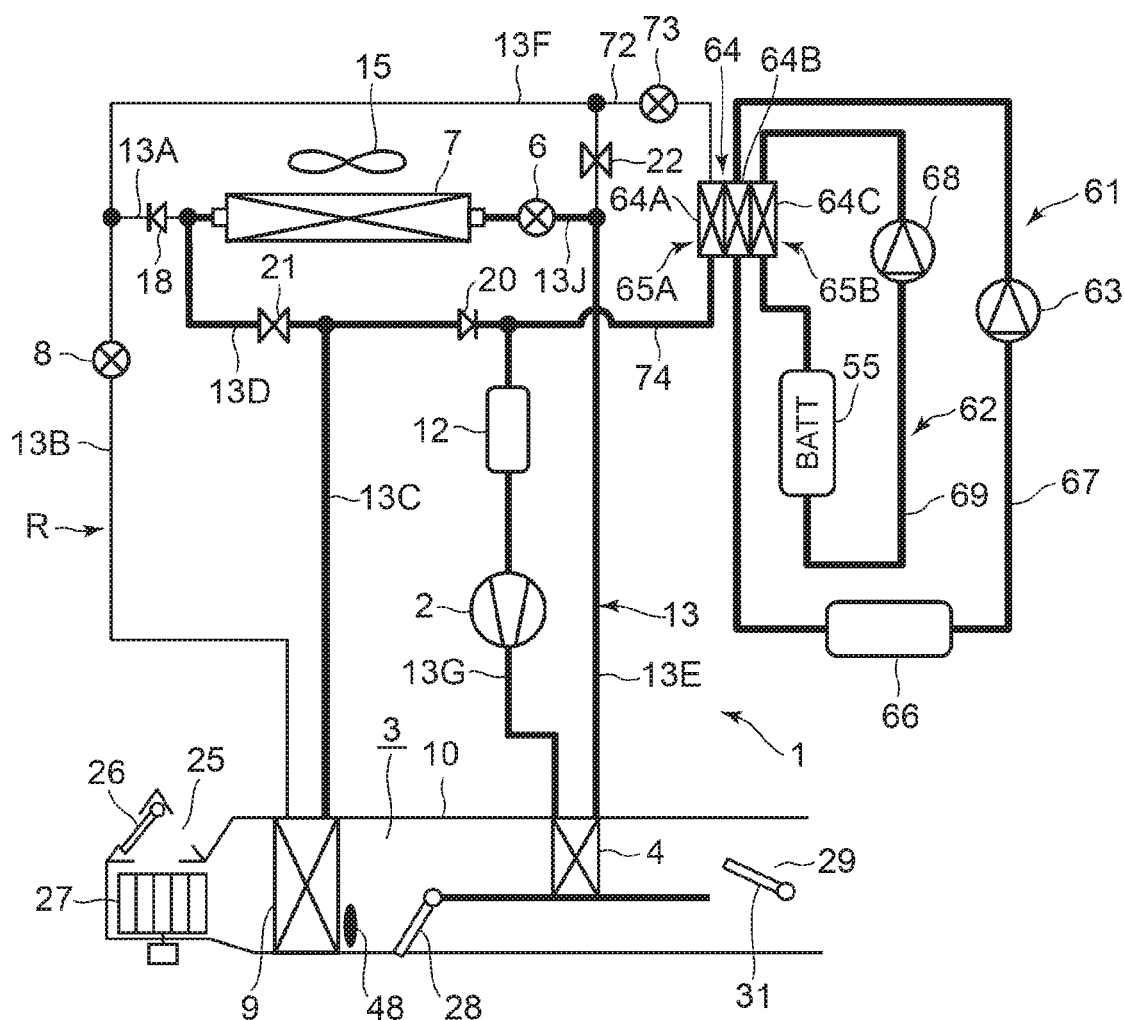
FIG. 1 is a constitutional view of a vehicle air-conditioning device of an embodiment to which the present invention is applied.

FIG. 1 illustrates a constitutional view of a vehicle air-conditioning device 1 of an embodiment of the present invention. A vehicle of the embodiment to which the present invention is applied is an electric vehicle (EV) in which an engine (an internal combustion engine) is not mounted, and is mounted with a battery 55 and runs with an electric motor for running (not shown in the drawing) which is driven by being supplied with power charged in the battery 55. The vehicle air-conditioning device 1 of the present invention is also driven by the power of the battery 55.

That is, in the electric vehicle which is not capable of performing heating by engine waste heat, the vehicle air-conditioning device 1 of the embodiment performs a heating operation by a heat pump operation in which a refrigerant circuit R is used. Further, the vehicle air-conditioning device 1 selectively executes respective air conditioning operations of a dehumidifying and heating operation, an internal cycle operation, a dehumidifying and cooling operation, and a cooling operation to perform air conditioning of a vehicle interior.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine. Furthermore, in the present application, the battery 55 is illustrated as a heat generating device mounted on the vehicle, but is not limited to it. The heat generating device includes the above-described electric motor for running, a control inverter of the electric motor, etc.

The vehicle air-conditioning device 1 of the embodiment performs air conditioning (heating, cooling, dehumidifying, and ventilation) of the vehicle interior of the electric vehicle. An electric type of compressor 2 to compress a refrigerant, a radiator 4 which is provided in an air flow passage 3 of an HVAC unit 10 in which air in the vehicle interior is ventilated and circulated, to let the high-temperature high-pressure refrigerant discharged from the compressor 2 flow therein via a refrigerant pipe 13G and to let the refrigerant radiate heat to the vehicle interior, an outdoor expansion valve 6 constituted of an electric valve (an electronic expansion valve) which decompresses and expands the refrigerant during the heating, an outdoor heat exchanger 7 which performs heat exchange between the refrigerant and outdoor air to function as a radiator to let the refrigerant radiate heat during the cooling and to function as an evaporator to let the refrigerant absorb heat during the heating, an indoor expansion valve 8 constituted of an electric valve (an electric expansion valve) to decompress and expand the refrigerant, a heat absorber 9 provided in the air flow passage 3 to let the refrigerant absorb heat during the cooling and dehumidifying from interior and exterior of the vehicle, an accumulator 12, and others are successively connected by a refrigerant pipe 13, whereby a refrigerant circuit R is constituted.

The outdoor expansion valve 6 decompresses and expands the refrigerant flowing out from the radiator 4 and flowing in the outdoor heat exchanger 7 and can also be fully closed. Further, the indoor expansion valve 8 decompresses and expands the refrigerant flowing in the heat absorber 9 and can also be fully closed.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, a refrigerant pipe 13A connected to a refrigerant outlet side of the outdoor heat exchanger 7 is connected to a refrigerant pipe 13B via a check valve 18. Incidentally, the check valve 18 has a refrigerant pipe 13B side which serves as a forward direction. Then, the refrigerant pipe 13B is connected to the indoor expansion valve 8.

In addition, the refrigerant pipe 13A extending out from the outdoor heat exchanger 7 branches before the check valve 18 (on a refrigerant upstream side), and this branching refrigerant pipe 13D communicates and connects with a refrigerant pipe 13C located on an outlet side of the heat absorber 9 via a solenoid valve 21 to be opened during the heating. Then, the refrigerant pipe 13C on a refrigerant downstream side from a location to which the refrigerant pipe 13D is connected is connected to the accumulator 12 via a check valve 20. The accumulator 12 is connected to a refrigerant suction side of the compressor 2. Incidentally, the check valve 20 has an accumulator 12 side which serves as a forward direction.

Furthermore, a refrigerant pipe 13E on an outlet side of the radiator 4 branches to a refrigerant pipe 13J and a refrigerant pipe 13F before the outdoor expansion valve 6 (on a refrigerant upstream side). One branching refrigerant pipe 13J is connected to a refrigerant inlet side of the outdoor heat exchanger 7 via the outdoor expansion valve 6. Additionally, the other branching refrigerant pipe 13F communicates and connects with a connecting part of the refrigerant pipe 13A and the refrigerant pipe 13B located on a refrigerant downstream side of the check valve 18 via a solenoid valve 22 to be opened during the dehumidifying. Consequently, the refrigerant pipe 13F is connected in parallel with a series circuit of the outdoor expansion valve 6, the outdoor heat exchanger 7, and the check valve 18. The refrigerant pipe 13F bypasses the outdoor expansion valve 6, the outdoor heat exchanger 7, and the check valve 18.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (indoor air circulation) and outdoor air which is air outside the vehicle interior (outdoor air introduction). Furthermore, an indoor blower (a blower fan) 27 to supply the introduced indoor or outdoor air to the air flow passage 3 is disposed on an air downstream side of the suction changing damper 26.

Additionally, in the air flow passage 3 on an air upstream side of the radiator 4, there is provided an air mix damper 28 to adjust a ratio at which the air in the air flow passage 3 (the indoor or outdoor air) flowing into the air flow passage 3 and passed through the heat absorber 9 is to be passed through the radiator 4. Furthermore, in the air flow passage 3 on an air downstream side of the radiator 4, there is formed each outlet (represented by an outlet 29 in FIG. 1) of FOOT (foot), VENT (vent) or DEF (defroster), and in the outlet 29, an outlet changing damper 31 is disposed to execute changing control of blowing of the air from each outlet mentioned above.

Furthermore, the vehicle air-conditioning device 1 of the present invention is provided with independent first and second heat medium circulating devices 61 and 62 to heat the battery 55 (a heat generating device) or recover waste heat of the battery 55, or cool the battery 55. The first heat medium circulating device 61 of the embodiment is provided with a circulating pump 63 (a first circulating pump) as a circulating device for circulating a first heat medium, a heat medium heating heater 66 as a heating device, and a first heat medium flow passage 64B which constitutes a first heat medium heat exchanging unit 65A of a three medium heat exchanger 64. They are annularly connected by a heat medium pipe 67.

Additionally, the second heat medium circulating device 62 of the embodiment is provided with a circulating pump 68 (a second circulating pump) as a circulating device for circulating a second heat medium to the battery 55, and a second heat medium flow passage 64C which constitutes a second heat medium heat exchanging unit 65B of the three medium heat exchanger 64. Those and the battery 55 are annularly connected by a heat medium pipe 69.

In the case of the present embodiment, an inlet of the first heat medium flow passage 64B is connected to a discharge side of the circulating pump 63 of the first heat medium circulating device 61. The heat medium heating heater 66 is connected to an outlet of the first heat medium flow passage 64B. An outlet of the heat medium heating heater 66 is connected to a suction side of the circulating pump 63. Further, an inlet of the second heat medium flow passage 64C is connected to a discharge side of the circulating pump 68 of the second heat medium circulating device 62. An inlet of the battery 55 is connected to an outlet of the second heat medium flow passage 64C, and an outlet of the battery 55 is connected to a suction side of the circulating pump 68.

As the first and second heat mediums used in these first and second heat medium circulating devices 61 and 62, for example, water, a refrigerant such as HFO-1234f, liquid such as a coolant or the like, or gas such as air or the like can be employed. Incidentally, in the embodiment, water is employed as the first and second heat mediums. Also, the heat medium heating heater 66 is constituted of an electric heater such as a PTC heater or the like. Further, for example, a jacket structure capable of circulating the second heat medium in a heat exchange relation with the battery 55 is provided around the battery 55.

Then, when the circulating pump 63 of the first heat medium circulating device 61 is operated, the first heat medium discharged from the circulating pump 63 flows into the first heat medium flow passage 64B of the three medium heat exchanger 64. When the first heat medium flowing out from the first heat medium flow passage 64B reaches the heat medium heating heater 66, and the heat medium heating heater 66 generates heat, the first heat medium is heated thereat and then sucked into the circulating pump 63. Thus, the first heat medium is circulated in the heat medium pipe 67.

Further, when the circulating pump 68 of the second heat medium circulating device 62 is operated, the second heat medium discharged from the circulating pump 68 flows into the second heat medium flow passage 64C of the three medium heat exchanger 64. The second heat medium flowing out from the second heat medium flow passage 64C reaches the battery 55 and performs heat exchange with the battery 55 thereat, and is then sucked into the circulating pump 68. Thus, the second heat medium is circulated in the heat medium pipe 69.

On the other hand, one end of a branch pipe 72 is connected to a refrigerant downstream side of the solenoid valve 22 of the refrigerant pipe 13F of the refrigerant circuit R. The branch pipe 72 is provided with an auxiliary expansion valve 73 constituted of an electric valve (an electric expansion valve). The auxiliary expansion valve 73 is capable of decompressing and expanding the refrigerant flowing into a refrigerant flow passage 64A to be described later, of the three medium heat exchanger 64 and also performing full closing. Then, the other end of the branch pipe 72 is connected to the refrigerant flow passage 64A of the three medium heat exchanger 64. One end of a refrigerant pipe 74 is connected to an outlet of the refrigerant flow passage 64A, and the other end of the refrigerant pipe 74 is connected to the refrigerant pipe 13C before the accumulator 12 (a refrigerant upstream side) and located on a refrigerant downstream side of the check valve 20.

It is to be noted that these auxiliary expansion valve 73 and others also constitute a part of the refrigerant circuit R, and at the same time constitutes even parts of the first and second heat medium circulating devices 61 and 62. Further, the three medium heat exchanger 64 is a heat exchanger in which the above-described refrigerant flow passage 64A, first heat medium flow passage 64B, and second heat medium flow passage 64C are integrated. The refrigerant flow passage 64A and the first heat medium flow passage 64B have a heat exchange relation with each other, and the first heat medium flow passage 64B and the second heat medium flow passage 64C have a heat exchange relation with each other.

Since these refrigerant flow passage 64A and first heat medium flow passage 64B constitute the first heat medium heat exchanging unit 65A of the three medium heat exchanger 64, and the refrigerant flow passage 64A and the first heat medium flow passage 64B constitute a part of the first heat medium heat exchanging unit 65A, respectively, the first heat medium circulating device 61 has the first heat medium heat exchanging unit 65A. Further, since the first heat medium flow passage 64B and the second heat medium flow passage 64C constitute the second heat medium heat exchanging unit 65B of the three medium heat exchanger 64, and the first heat medium flow passage 64B and the second heat medium flow passage 64C constitute a part of the second heat medium heat exchanging unit 65B, respectively, the second heat medium circulating device 62 has the second heat medium heat exchanging unit 65B.

In particular, since the three medium heat exchanger 64 of the embodiment is the heat exchanger in which the refrigerant flow passage 64A, the first heat medium flow passage 64B, and the second heat medium flow passage 64C are integrated as described above, the three medium heat exchanger 64 takes a compact configuration in which the above-described first heat medium heat exchanging unit 65A and second heat medium heat exchanging unit 65B are made integral.

When the auxiliary expansion valve 73 and the solenoid valve 22 on the refrigerant circuit R side are opened, the refrigerant flowing in the refrigerant pipe 13F is decompressed in the auxiliary expansion valve 73 and then flows into the refrigerant flow passage 64A of the three medium heat exchanger 64 to evaporate there. The refrigerant performs heat exchange with the first heat medium flowing through the first heat medium flow passage 64B in the process of flowing through the refrigerant flow passage 64A, and absorbs heat from the first heat medium, followed by being sucked into the compressor 2 through the accumulator 12. Further, the first heat medium performs heat exchange with the second heat medium flowing through the second heat medium flow passage 64C in the process of flowing through the first heat medium flow passage 64B.

Figure 2:
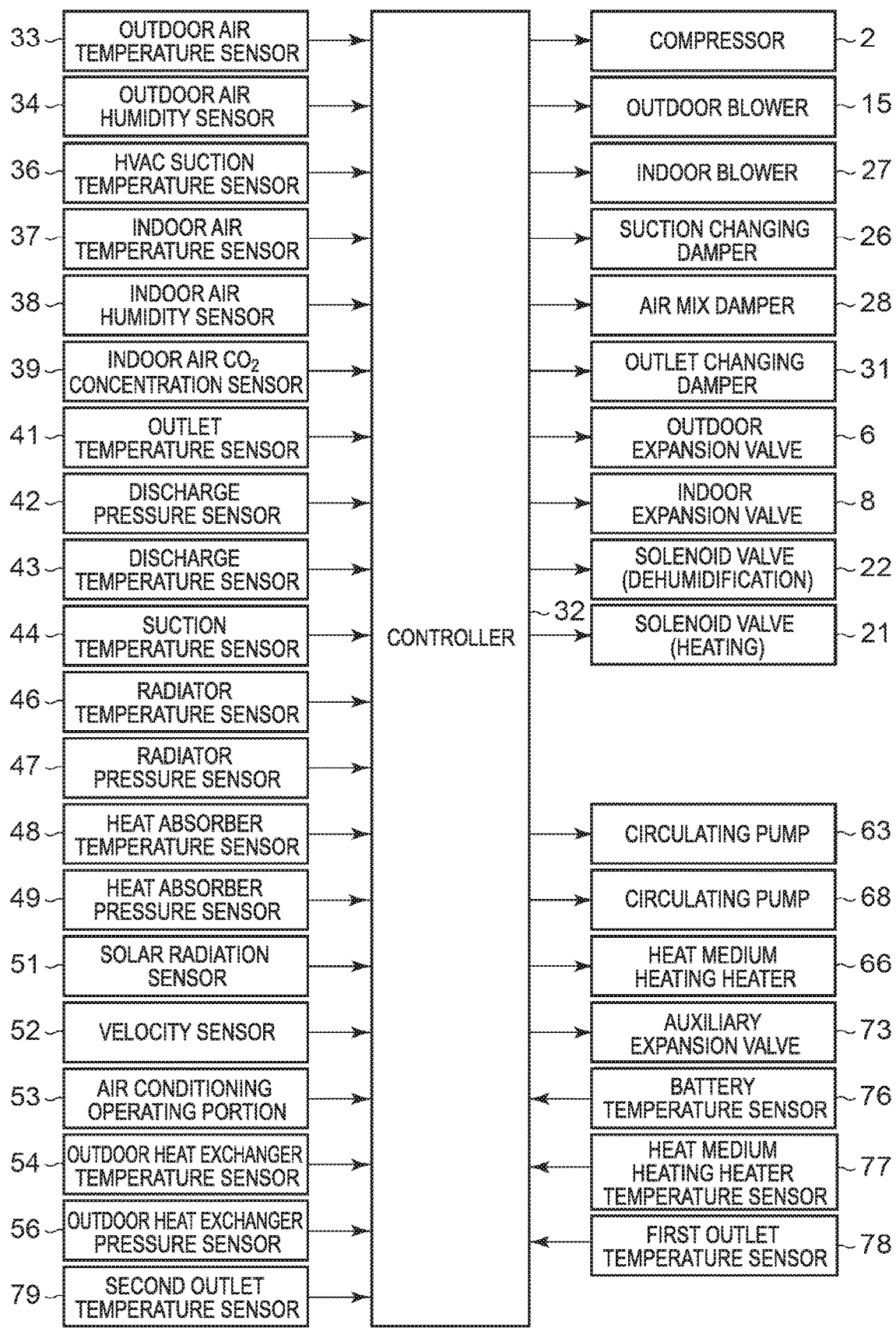
FIG. 2 is a block diagram of an electric circuit of a controller in the vehicle air-conditioning device of FIG. 1.

Next, in FIG. 2, 32 is a controller (ECU) as a control device. The controller 32 is constituted of a microcomputer that is an example of a computer including a processor, and an input of the controller is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction temperature sensor 44 which detects a temperature of the refrigerant to be sucked into the compressor 2, a radiator temperature sensor 46 which detects a temperature of the radiator 4 (the temperature of the air passed through the radiator 4 or the temperature of the radiator 4 itself: a radiator temperature TCI), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle interior, a velocity sensor 52 to detect a moving speed (a velocity) of the vehicle, an air conditioning operating portion 53 (aircon operating portion) to set the changing of a predetermined temperature or an air conditioning operation, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself: an outdoor heat exchanger temperature TXO. When the outdoor heat exchanger 7 functions as an evaporator, the outdoor heat exchanger temperature TXO becomes an evaporation temperature of the refrigerant in the outdoor heat exchanger 7), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7).

Furthermore, the input of the controller 32 is further connected also to respective outputs of a battery temperature sensor 76 which detects a temperature of the battery 55 (a temperature of the battery 55 itself, or a temperature of the heat medium flowing out from the battery 55, or a temperature of the heat medium flowing into the battery 55: a battery temperature Tb), a heat medium heating heater temperature sensor 77 which detects a temperature of the heat medium heating heater 66 (a temperature of the heat medium heating heater 66 itself, and a temperature of the heat medium flowing out from the heat medium heating heater 66), a first outlet temperature sensor 78 which detects a temperature (an outlet heat medium temperature Tout) of the first heat medium on the outlet side of the first heat medium flow passage 64B (the first heat medium heat exchanging unit 65A) of the three medium heat exchanger 64, and a second outlet temperature sensor 79 which detects a temperature of the refrigerant flowing out from the refrigerant flow passage 64A.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 22 (dehumidification), the solenoid valve 21 (heating), the respective circulating pumps 63 and 68, the heat medium heating heater 66, and the auxiliary expansion valve 73. Then, the controller 32 controls these components on the basis of the outputs of the respective sensors and the setting input by the air conditioning operating portion 53.

Next, an operation of the vehicle air-conditioning device 1 of the embodiment, having the above constitution will be described. In the embodiment, the controller 32 changes and executes the respective air conditioning operations of the heating operation, the dehumidifying and heating operation, the internal cycle operation, the dehumidifying and cooling operation, and the cooling operation and performs a heating assistance operation using the heat medium heating heater 66 of the first heat medium circulating device 61. Further, the controller 32 heats the battery 55 using the heat medium heating heater 66 of the first heat medium circulating device 61 and the second heat medium circulating device 62 and recovers waste heat of the battery 55 or cools the battery 55 to adjust the temperature of the battery 55. However, description will initially be made as to each air conditioning operation of the refrigerant circuit R.

(1) Heating Operation

Figure 3:
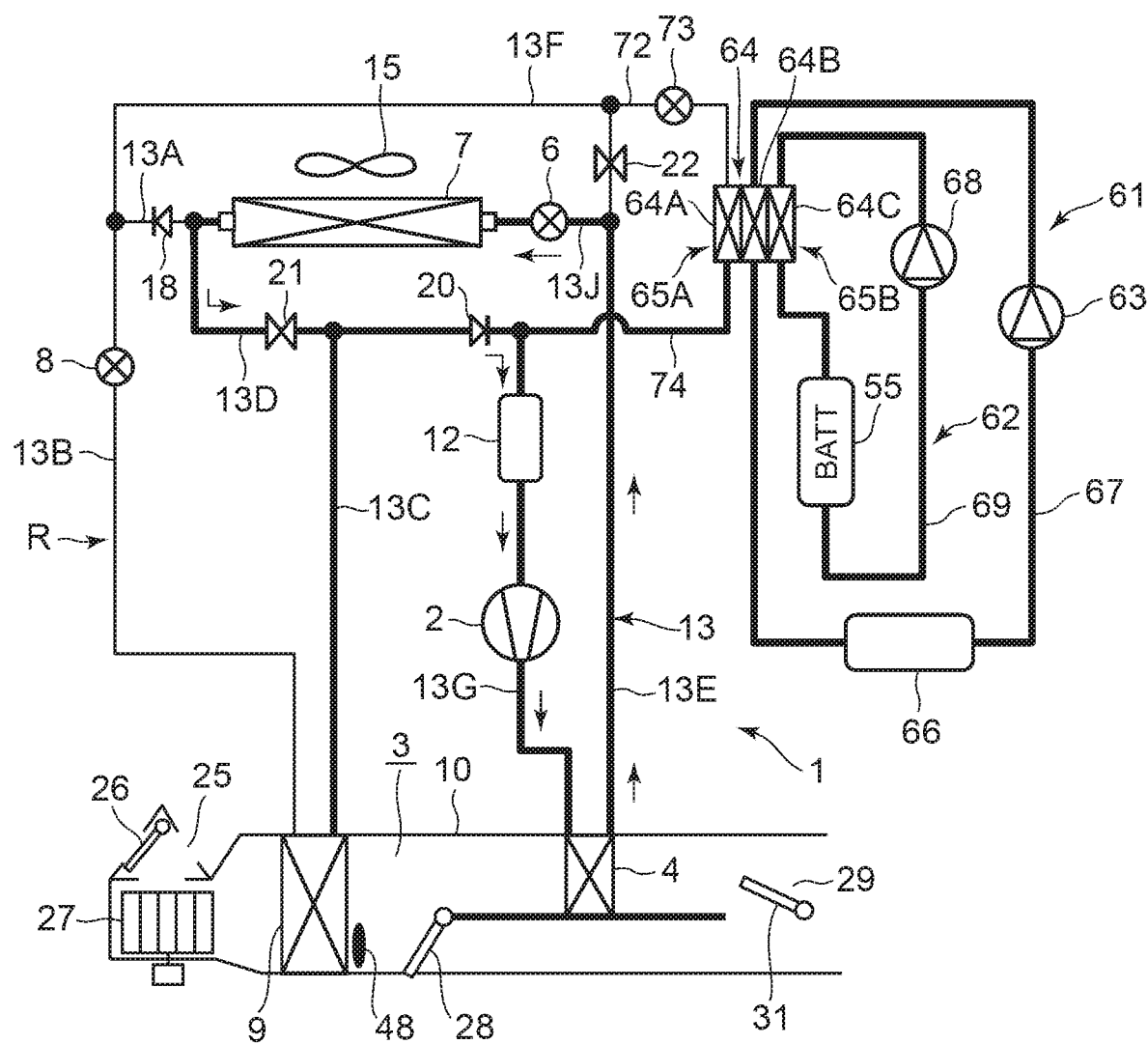
FIG. 3 is a diagram describing a heating operation by the controller of FIG. 2.

Description will first be made as to the heating operation with reference to FIG. 3. FIG. 3 shows the flow (solid line arrows) of the refrigerant of the refrigerant circuit R in the heating operation. When the heating operation is selected by the controller 32 (an automatic mode) or a manual operation to the air conditioning operating portion 53 (a manual mode), the controller 32 opens the solenoid valve 21 (for the heating) and fully closes the indoor expansion valve 8 (a fully closed position). Further, the controller opens the outdoor expansion valve 6 to set the refrigerant to its decompression controlled state, and closes the solenoid valve 22 (for the dehumidification). Incidentally, the control of the auxiliary expansion valve 73 during the heating operation will be described in detail later.

Then, the controller operates the compressor 2 and the respective blowers 15 and 27, and the air mix damper 28 has a state of adjusting a ratio at which the air blown out from the indoor blower 27 is to be passed through the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). In other words, the refrigerant circuit R functions as a heat pump. Then, the low-temperature refrigerant flowing out from the outdoor heat exchanger 7 reaches the refrigerant pipe 13C through the refrigerant pipe 13A and the refrigerant pipe 13D, and the solenoid valve 21, and flows into the accumulator 12 via the check valve 20 to perform gas-liquid separation therein, and the gas refrigerant is then sucked into the compressor 2, thereby repeating this circulation. The air heated in the radiator 4 is blown out from the outlet 29, thereby performing the heating of the vehicle interior.

The controller 32 calculates a target radiator pressure PCO (a target value of the pressure PCI of the radiator 4) from a target heater temperature TCO (a target value of a temperature TH of the air through the radiator 4) calculated from an after-mentioned target outlet temperature TAO, and controls the number of revolutions of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Further, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree of the refrigerant in an outlet of the radiator 4. The target heater temperature TCO is basically TCO=TAO, but a predetermined limit of controlling is provided.

(2) Dehumidifying and Heating Operation

Figure 4:
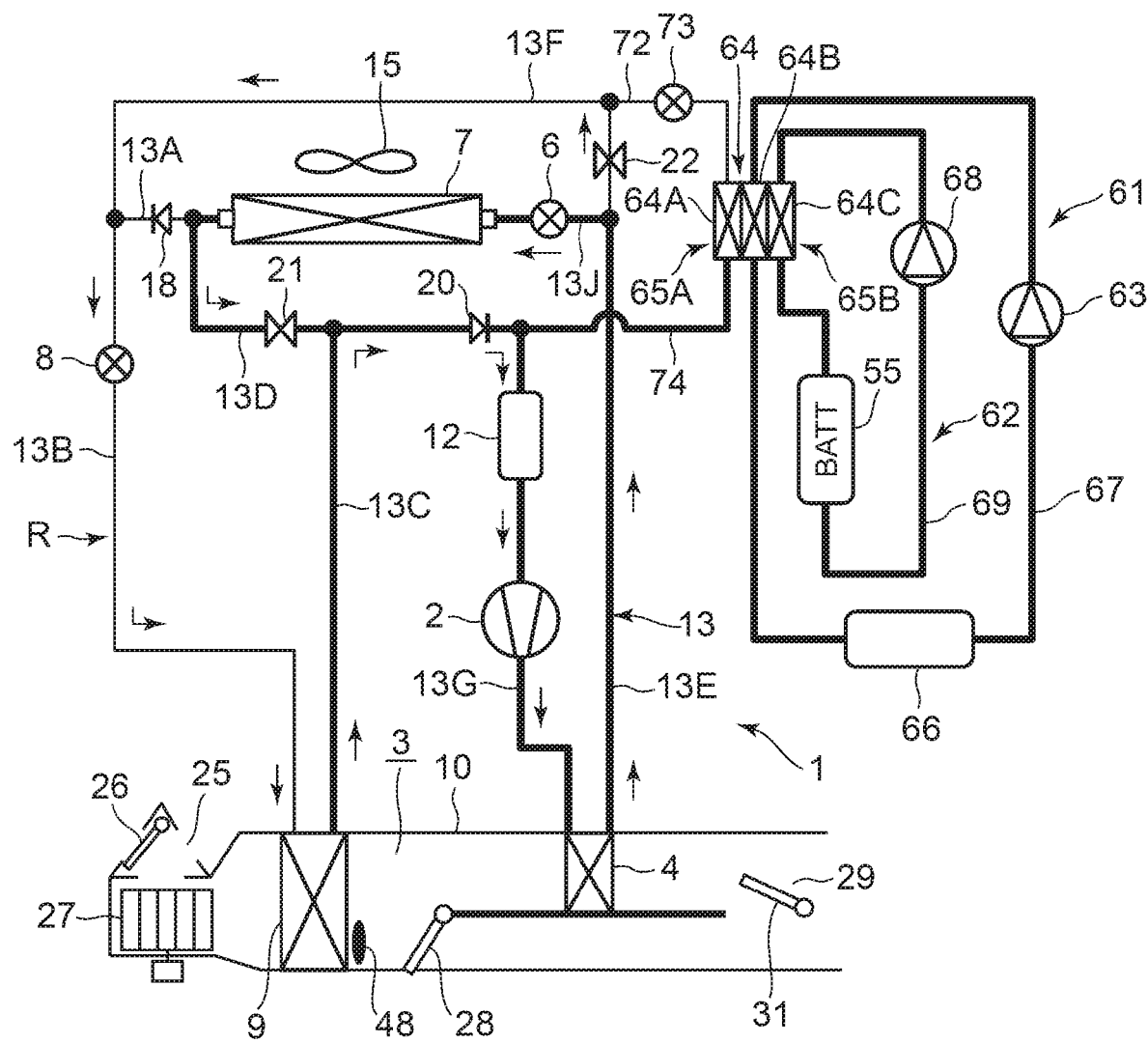
FIG. 4 is a diagram describing a dehumidifying and heating operation by the controller of FIG. 2.

Next, description will be made as to the dehumidifying and heating operation with reference to FIG. 4. FIG. 4 shows the flow (solid line arrows) of the refrigerant of the refrigerant circuit R in the dehumidifying and heating operation. In the dehumidifying and heating operation, the controller 32 opens the solenoid valve 22 in the above state of the heating operation. However, the auxiliary expansion valve 73 is fully closed (fully closed position). Further, the controller also opens the indoor expansion valve 8 to set the refrigerant to its decompression controlled state. In consequence, a part of the condensed refrigerant flowing into the refrigerant pipe 13E through the radiator 4 is distributed, the distributed refrigerant flows through the solenoid valve 22 into the refrigerant pipe 13F and flows from the refrigerant pipe 13B into the indoor expansion valve 8, and the residual refrigerant flows through the outdoor expansion valve 6. That is, the distributed part of the refrigerant is decompressed in the indoor expansion valve 8, and then flows into the heat absorber 9 to evaporate.

The controller 32 controls a valve position of the indoor expansion valve 8 to maintain a superheat degree (SH) of the refrigerant in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time, and hence, the air is cooled and dehumidified. The distributed residual refrigerant flowing into the refrigerant pipe 13J is decompressed in the outdoor expansion valve 6, and then evaporates in the outdoor heat exchanger 7.

The refrigerant evaporated in the heat absorber 9 flows out to the refrigerant pipe 13C to join the refrigerant (the refrigerant from the outdoor heat exchanger 7) from the refrigerant pipe 13D, and then flows through the check valve 20 and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior.

The controller 32 controls the number of revolutions of the compressor 2 on the basis of the target radiator pressure PCO calculated from the target heater temperature TCO and the radiator pressure PCI detected by the radiator pressure sensor 47 (the high pressure of the refrigerant circuit R), and the controller controls the valve position of the outdoor expansion valve 6 on the basis of the temperature (the heat absorber temperature Te) of the heat absorber 9 which is detected by the heat absorber temperature sensor 48.

(3) Internal Cycle Operation

Figure 5:
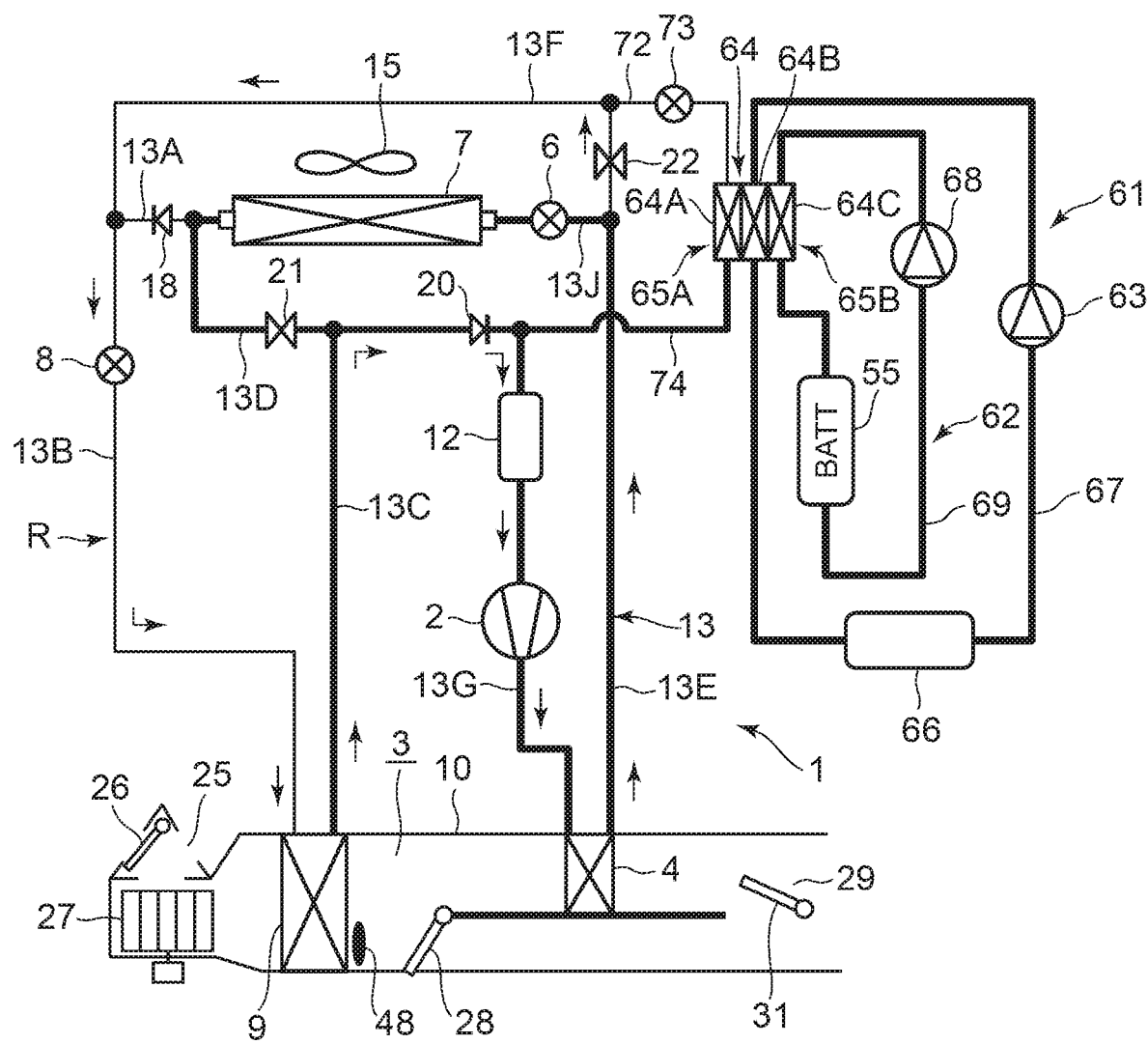
FIG. 5 is a diagram describing an internal cycle operation by the controller of FIG. 2.

Next, description will be made as to the internal cycle operation with reference to FIG. 5. FIG. 5 shows the flow (solid line arrows) of the refrigerant of the refrigerant circuit R in the internal cycle operation. In the internal cycle operation, the controller 32 fully closes the outdoor expansion valve 6 in the above state of the dehumidifying and heating operation (a fully closed position). However, the solenoid valve 21 is maintained in an opened state, and the refrigerant outlet of the outdoor heat exchanger 7 is made to communicate with the refrigerant suction side of the compressor 2. That is, this internal cycle operation is a state where the outdoor expansion valve 6 is fully closed under the control of the outdoor expansion valve 6 in the dehumidifying and heating operation, and hence, this internal cycle operation can also be grasped as a part of the dehumidifying and heating operation.

However, the outdoor expansion valve 6 is closed, thereby obstructing inflow of the refrigerant into the outdoor heat exchanger 7, and hence, all the condensed refrigerant flowing through the radiator 4 into the refrigerant pipe 13E flows through the solenoid valve 22 to the refrigerant pipe 13F. Then, the refrigerant flowing through the refrigerant pipe 13F flows from the refrigerant pipe 13B to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows into the refrigerant pipe 13C and flows through the check valve 20 and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle operation, the refrigerant circulates between the radiator 4 (heat radiation) and the heat absorber 9 (heat absorption) which are present in the air flow passage 3 on an indoor side, and hence, the heat is not pumped up from the outdoor air, but the heating capability for a consumed power of the compressor 2 is exerted. The whole amount of the refrigerant flows through the heat absorber 9 which exerts a dehumidifying operation, and hence, as compared with the above dehumidifying and heating operation, a dehumidifying capability is higher, but the heating capability becomes low.

Further, the outdoor expansion valve 6 is closed but the solenoid valve 21 is opened, and the refrigerant outlet of the outdoor heat exchanger 7 communicates with the refrigerant suction side of the compressor 2. Hence, the liquid refrigerant in the outdoor heat exchanger 7 flows out to the refrigerant pipe 13C through the refrigerant pipe 13D and the solenoid valve 21 and is recovered to the accumulator 12, so that the outdoor heat exchanger 7 is subjected to a state of the gas refrigerant therein. Thus, as compared with the case where the solenoid valve 21 is closed, the amount of the refrigerant circulated in the refrigerant circuit R is increased, thereby making it possible to enhance the heating capability of the radiator 4 and the dehumidifying capability of the heat absorber 9.

The controller 32 controls the number of revolutions of the compressor 2 on the basis of the temperature of the heat absorber 9 or the above-mentioned radiator pressure PCI (the high pressure of the refrigerant circuit R). At this time, the controller 32 selects a smaller compressor target number of revolutions from compressor target numbers of revolutions obtainable by either of calculations from the temperature of the heat absorber 9 and the radiator pressure PCI, to control the compressor 2.

(4) Dehumidifying and Cooling Operation

Figure 6:
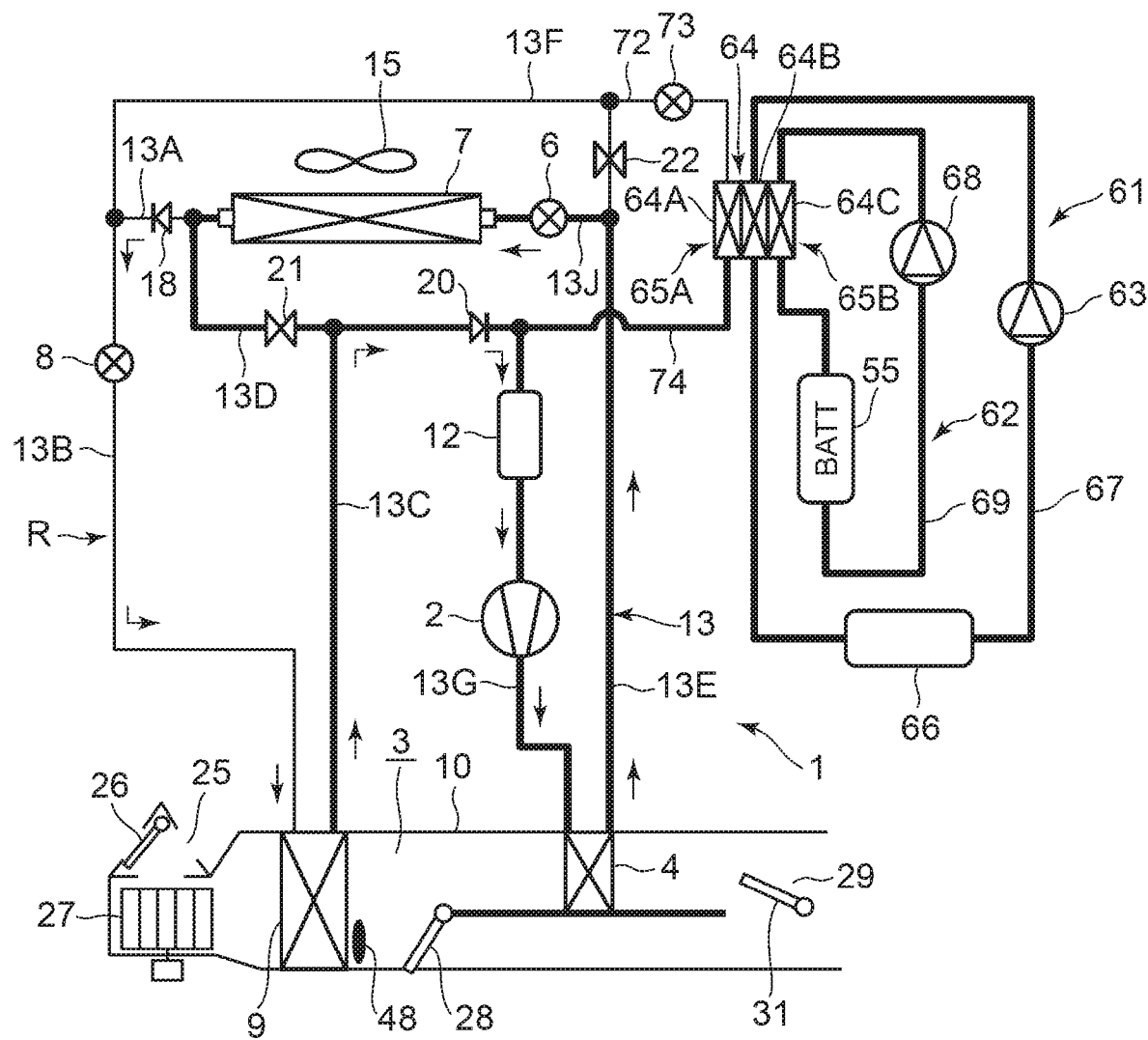
FIG. 6 is a diagram describing a dehumidifying and cooling operation by the controller of FIG. 2.

Next, description will be made as to the dehumidifying and cooling operation with reference to FIG. 6. FIG. 6 shows the flow (solid line arrows) of the refrigerant of the refrigerant circuit R in the dehumidifying and cooling operation. In the dehumidifying and cooling operation, the controller 32 opens the outdoor expansion valve 6 and the indoor expansion valve 8 to make into a state of performing decompression control of the refrigerant respectively, and closes the solenoid valve 21. Further, the controller closes the solenoid valve 22. Then, the controller operates the compressor 2 and the respective blowers 15 and 27, and the air mix damper 28 has a state of adjusting a ratio at which the air blown out from the indoor blower 27 is to be passed through the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4. On the other hand, the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. The refrigerant flowing out from the outdoor heat exchanger 7 flows through the refrigerant pipe 13A and the check valve 18 to enter the refrigerant pipe 13B and reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the refrigerant pipe 13C to reach the check valve 20, and then flows through the accumulator 12 to be sucked into the compressor 2, thereby repeating this circulation. The air cooled and dehumidified in the heat absorber 9 is reheated in the process of passing the radiator 4 (reheating: a radiation capability is lower than that during the heating), thereby performing the dehumidifying and cooling of the vehicle interior.

The controller 32 controls, based on the temperature (the heat absorber temperature Te) of the heat absorber 9 which is detected by the heat absorber temperature sensor 48, and a target heat absorber temperature TEO being its target value, the number of revolutions of the compressor 2 to set the heat absorber temperature Te to the target heat absorber temperature TEO, and controls, based on the radiator pressure PCI (the high pressure of the refrigerant circuit R) detected by the radiator pressure sensor 47 and the target radiator pressure PCO (the target value of the radiator pressure PCI) calculated from the target heater temperature TCO, the valve position of the outdoor expansion valve 6 to set the radiator pressure PCI to the target radiator pressure PCO, thereby obtaining a required amount of reheat by the radiator 4.

(5) Cooling Operation

Figure 7:
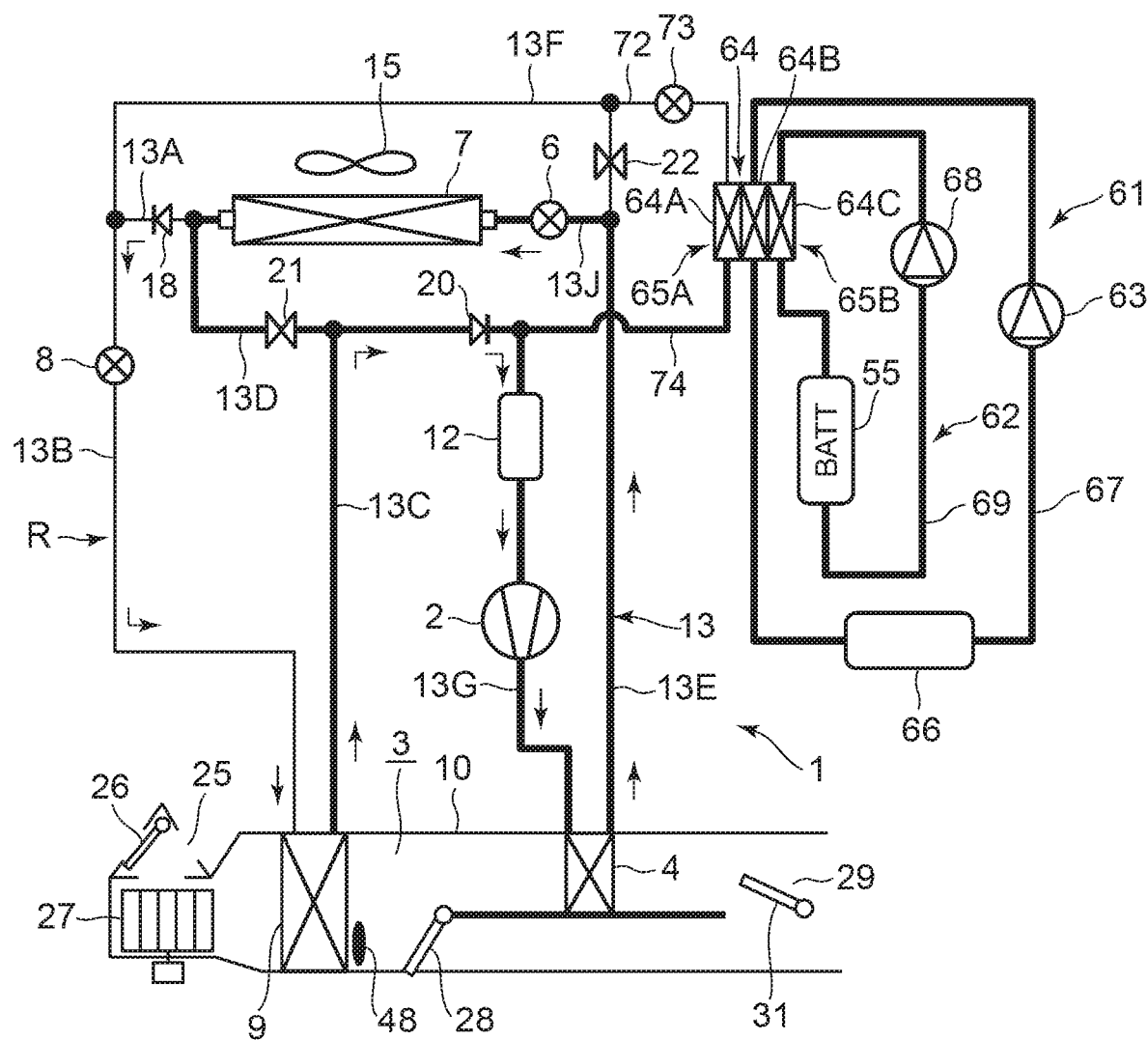
FIG. 7 is a diagram describing a cooling operation by the controller of FIG. 2.

Next, description will be made as to the cooling operation with reference to FIG. 7. FIG. 7 shows the flow (solid line arrows) of the refrigerant of the refrigerant circuit R in the cooling operation. In the cooling operation, the controller 32 fully opens the outdoor expansion valve 6 in the above state of the dehumidifying and cooling operation (fully opened position). It is to be noted that the air mix damper 28 has a state of adjusting a ratio at which the air is to be passed through the radiator 4.

In consequence, the high-temperature high-pressure gas refrigerant discharged from the compressor 2 flows into the radiator 4. The air in the air flow passage 3 is passed through the radiator 4 but its ratio becomes small (because of only reheat during the cooling). The refrigerant therefore only passes the radiator, and the refrigerant flowing out from the radiator 4 flows through the refrigerant pipe 13E to reach the outdoor expansion valve 6. At this time, the outdoor expansion valve 6 is fully opened, and hence, the refrigerant passes the refrigerant pipe 13J and flows into the outdoor heat exchanger 7 as it is, in which the refrigerant is cooled by the running therein or the outdoor air to pass through the outdoor blower 15, to condense and liquefy. The refrigerant flowing out from the outdoor heat exchanger 7 flows through the refrigerant pipe 13A and the check valve 18 to enter the refrigerant pipe 13B, and reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled.

The refrigerant evaporated in the heat absorber 9 flows through the refrigerant pipe 13C to reach the accumulator 12 through the check valve 20, and flows therethrough to be sucked into the compressor 2, thereby repeating this circulation. The air cooled and dehumidified in the heat absorber 9 is blown out from the outlet 29 to the vehicle interior, thereby performing the cooling of the vehicle interior. In this cooling operation, the controller 32 controls the number of revolutions of the compressor 2 on the basis of the temperature (the heat absorber temperature Te) of the heat absorber 9 which is detected by the heat absorber temperature sensor 48.

(6) Changing of Air Conditioning Operation

The controller 32 calculates the above-mentioned target outlet temperature TAO from the following equation (I). The target outlet temperature TAO is a target value of the temperature of the air to be blown out from the outlet 29 to the vehicle interior.

$$TAO=(Tset-Tin) \times K+Tbal(f(Tset,SUN,Tam)) \qquad (I)$$

where Tset is a predetermined temperature of the vehicle interior which is set by the air conditioning operating portion 53, Tin is a temperature of the vehicle interior air which is detected by the indoor air temperature sensor 37, K is a coefficient, and Tbal is a balance value calculated from the predetermined temperature Tset, a solar radiation amount SUN detected by the solar radiation sensor 51, and the outdoor air temperature Tam detected by the outdoor air temperature sensor 33. Furthermore, in general, the lower the outdoor air temperature Tam is, the higher the target outlet temperature TAO becomes, and the higher the outdoor air temperature Tam is, the lower the target outlet temperature TAO becomes.

Then, the controller 32 selects any air conditioning operation from the above respective air conditioning operations on the basis of the outdoor air temperature Tam detected by the outdoor air temperature sensor 33 and the target outlet temperature TAO on startup. Furthermore, after the startup, the controller selects and changes the above respective air conditioning operations in accordance with changes of environments and setting conditions such as the outdoor air temperature Tam and the target outlet temperature TAO.

(7) Control of First and Second Heat Medium Circulating Devices 61 and 62

Next, description will be made as to control of the first and second heat medium circulating devices 61 and 62, which is executed by the controller 32, with reference to FIGS. 8 to 10. As described above, the battery 55 is reduced in charging/discharging performance under a low-temperature environment. Further, when the battery 55 performs charging/discharging under an environment in which the battery becomes high in temperature due to its self-heat generation or the like, its deterioration progresses.

Thus, the controller 32 basically controls, based on the temperature (the battery temperature Tb) of the battery 55 (the heat generating device) which is detected by the battery temperature sensor 76, the first and second heat medium circulating devices 61 and 62 as will be described later to adjust the battery temperature Tb to be within an operating temperature range of greater than or equal to a predetermined operating lower limit temperature BL (for example, 0° C.) and less than or equal to an operating upper limit temperature BH (for example, +40° C.). Since, however, the first heat medium circulating device 61 is provided with the heat medium heating heater 66, the heating assistance of the vehicle interior is performed by using the heat medium heating heater 66 in a situation in which the heating capability by the radiator 4 runs short at a low outdoor air temperature or the like.

(7-1) Heating Assistance Operation

First, the heating assistance operation executed by the controller 32 in the heating operation of FIG. 3 will be described with reference to FIG. 8. In the heating operation (FIG. 3), the controller 32 calculates a required heating capability Qtgt being the heating capability of the vehicle interior required for the radiator 4, and a heating capability Qhp generable by the radiator 4 by using the following equations (II) and (III), for example.

$$Qtgt=(TCO-Te) \times Cpa \times \rho \times Qair \quad (II)$$

$$Qhp=f(Tam, NC, BLV, VSP, FANVout, Te) \quad (III)$$

where Te is a temperature of the heat absorber 9 detected by the heat absorber temperature sensor 48, Cpa is a specific heat of air flowing into the radiator 4 [kj/kg·K], $\rho$ is a density of the air flowing into the radiator 4 (specific volume) [kg/m$^3$], Qair is an amount of the air passing through the radiator 4 [m$^3$/h] (estimated from the blower voltage BLV of the indoor blower 27, etc.), VSP is a velocity obtained from the velocity sensor 52, and FANVout is a voltage of the outdoor blower 15.

Then, when a situation under which the calculated required heating capability Qtgt becomes larger than the heating capability Qhp generable by the radiator 4 (Qhp<Qtgt), and the heating capability of the radiator 4 runs short has occurred, the controller 32 opens the solenoid valve 22 and releases the auxiliary expansion valve 73 to set the refrigerant to its decompression controlled state. In consequence, a part of the refrigerant flowing out from the radiator 4 and flowing through the refrigerant circuit 13E is distributed to the refrigerant pipe 13F as indicated by solid line arrows in FIG. 8, and the residual refrigerant is decompressed in the outdoor expansion valve 6 and then flows into the outdoor heat exchanger 7 to evaporate and absorb heat from the outdoor air. On the other hand, the refrigerant distributed to the refrigerant pipe 13F is decompressed in the auxiliary expansion valve 73, and then flows into the refrigerant flow passage 64A of the three medium heat exchanger 64 to evaporate therein. This refrigerant absorbs heat from the first heat medium flowing through the first heat medium flow passage 64B in the process of flowing through the refrigerant flow passage 64A, and then flows through the accumulator 12 to be sucked into the compressor 2.

On the other hand, in terms of the controller 32, when the battery temperature Tb detected by the battery temperature sensor 76 is greater than or equal to the operating lower limit temperature TL (TL≤Tb) but is less than or equal to a predetermined value Tout1 (for example, +10° C. or so) of the temperature (outlet heat medium temperature Tout) of the first heat medium on the outlet side of the first heat medium flow passage 64B (the first heat medium heat exchanging unit 65A) of the three medium heat exchanger 64, which becomes a criterion of determining whether the waste heat of the battery 55 can be recovered to the refrigerant circuit R side (Tb≤Tout1), the controller 32 operates the circulating pump 63 of the first heat medium circulating device 61 (ON) and stops the circulating pump 68 of the second heat medium circulating device 62 (OFF).

Figure 8:
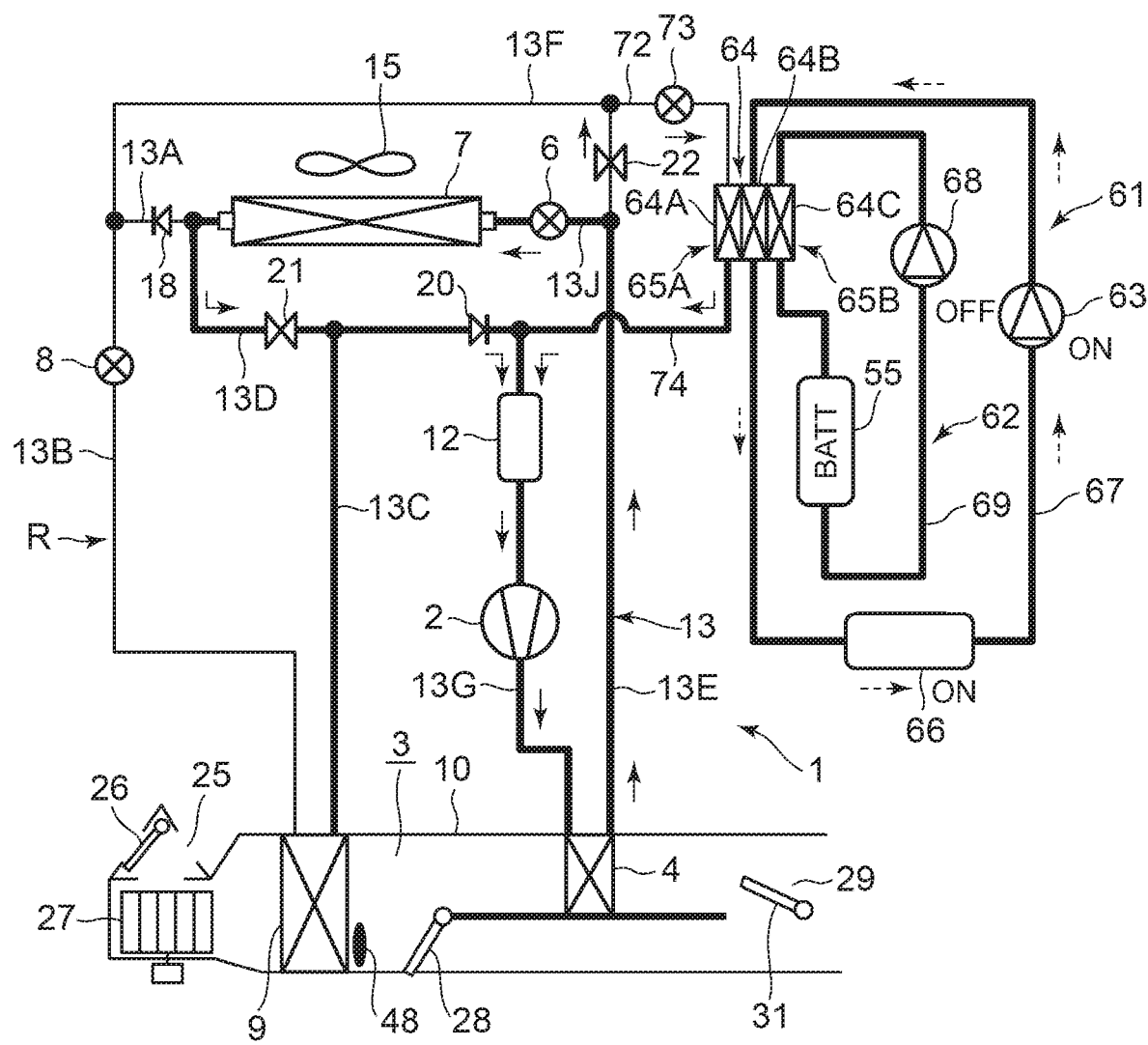
FIG. 8 is a diagram describing a heating assistance operation to be executed by the controller of FIG. 2 in the heating operation of FIG. 3.

Thus, the first heat medium in the first heat medium circulating device 61 is circulated in the heat medium pipe 67 as indicated by broken lines in FIG. 8, and the circulation of the second heat medium in the second heat medium circulating device 62 is stopped. Further, the controller 32 energizes the heat medium heating heater 66 to generate heat (ON). The first heat medium heated in the heat medium heating heater 66 is sucked in the circulating pump 63, and the heat medium discharged from the circulating pump 63 flows into the first heat medium flow passage 64B of the three medium heat exchanger 64, thereby performing heat exchange with the refrigerant of the refrigerant circuit R which flows through the refrigerant flow passage 64A.

The refrigerant evaporated in the refrigerant flow passage 64A of the three medium heat exchanger 64 pumps up heat of the first heat medium heated by the heat medium heating heater 66. As a result, the amount of heat generation of the heat medium heating heater 66 is transferred to the radiator 4 and added to the amount of heat pumped up from the outdoor air in the outdoor heat exchanger 7 to complement the heating capability of the vehicle interior. For example, on the basis of the difference (Qtgt−Qhp) between the required heating capability Qtgt and the heating capability Qhp, the controller 32 controls energization of the heat medium heating heater 66 by using the following equation (IV).

$$Qech=Qtgt-Qhp \quad (IV)$$

Incidentally, the above Qech is a required capability (the amount of heat generation) of the heat medium heating heater 66. Thus, the shortage of the heating capability Qhp is assisted (complemented) with respect to the required heating capability Qtgt. The vehicle interior is comfortably heated, and frosting to the outdoor heat exchanger 7 is also suppressed.

At this time, since the circulating pump 68 of the second heat medium circulating device 62 is stopped, and the second heat medium is not circulated to the battery 55, the first heat medium flowing through the first heat medium flow passage 64B of the three medium heat exchanger 64 absorbs heat from the battery 55 through the second heat medium, and the temperature of the first heat medium is also avoided from being lowered.

That is, upon executing the heating assistance operation by the heat medium heating heater 66, when the battery temperature Tb is low but greater than or equal to the operating lower limit temperature TL (TL≤Tb), and the battery 55 needs not to be heated, the circulating pump 63 of the first heat medium circulating device 61 is operated, and the circulating pump 68 of the second heat medium circulating device 62 is stopped, thereby making it possible to eliminate a disadvantage that the first heat medium heated by the heat medium heating heater 66 is lowered in temperature by heat exchange with the battery 55 via the second heat medium and avoid in advance a disadvantage that wasteful power corresponding to the thermal capacity of the battery 55 is consumed in the heat medium heating heater 66, whereby an efficient heating assistance operation can be realized.

In particular, in the embodiment, since the controller 32 determines that it is not necessary to heat the battery 55 when the temperature (the battery temperature Tb) of the battery 55 is greater than or equal to the operating lower limit temperature TL, it is possible to accurately determine that there is no need to heat the battery 55 and thereby control the operations of the respective heat medium circulating devices 61 and 62.

(7-2) Battery Waste Heat Recovering Operation

On the other hand, for example, when the battery temperature Tb rises by charging/discharging (it is assumed to be higher than the operating lower limit temperature TL) and becomes higher than the predetermined value Tout1 of the temperature (the outlet heat medium temperature Tout) of the first heat medium on the outlet side of the first heat medium flow passage 64B (the first heat medium heat exchanging unit 65A) of the above-described three medium heat exchanger 64 (Tout1<Tb) in a state in which, for example, the aforementioned heating operation of FIG. 3 and the above-described heating assistance operation of FIG. 8 are performed, the controller 32 determines the waste heat of the battery 55 to be recoverable and proceeds to the battery waste heat recovering operation. FIG. 9 is a diagram describing this battery waste heat recovering operation. In the battery waste heat recovering operation, the controller 32 operates the circulating pump 63 of the first heat medium circulating device 61 and the circulating pump 68 of the second heat medium circulating device 62 (ON), and energizes the heat medium heating heater 66 to generate heat (ON). Further, when the heating operation is performed, the controller 32 opens the solenoid valve 22 as with the aforementioned case of heating assistance operation, and releases the auxiliary expansion valve 73 to set the refrigerant to its decompression controlled state.

Figure 9:
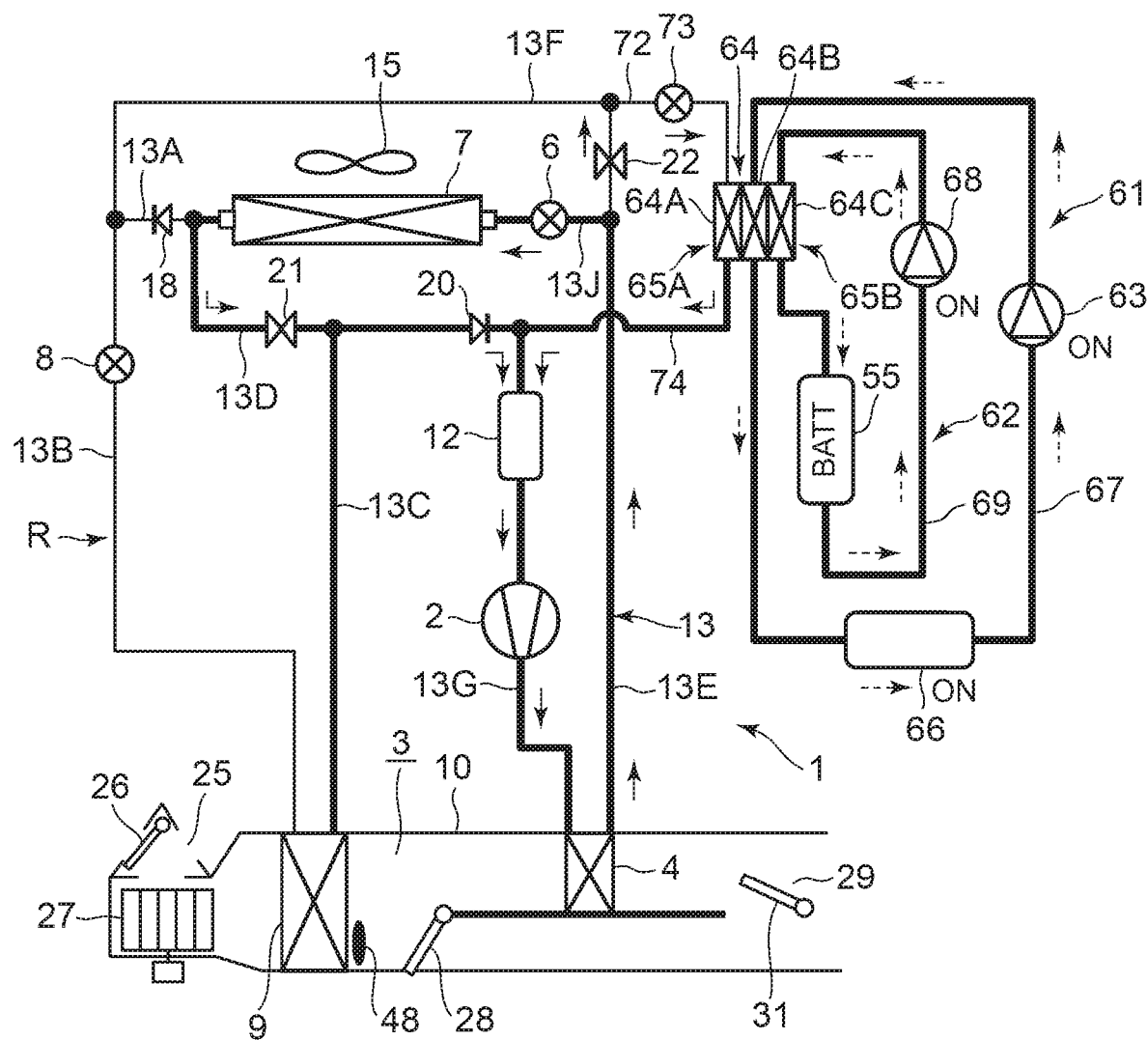
FIG. 9 is a diagram describing a battery waste heat recovery operation and a battery heating operation to be executed by the controller of FIG. 2 in the heating operation of FIG. 3 and the heating assistance operation of FIG. 8.
Figure 10:
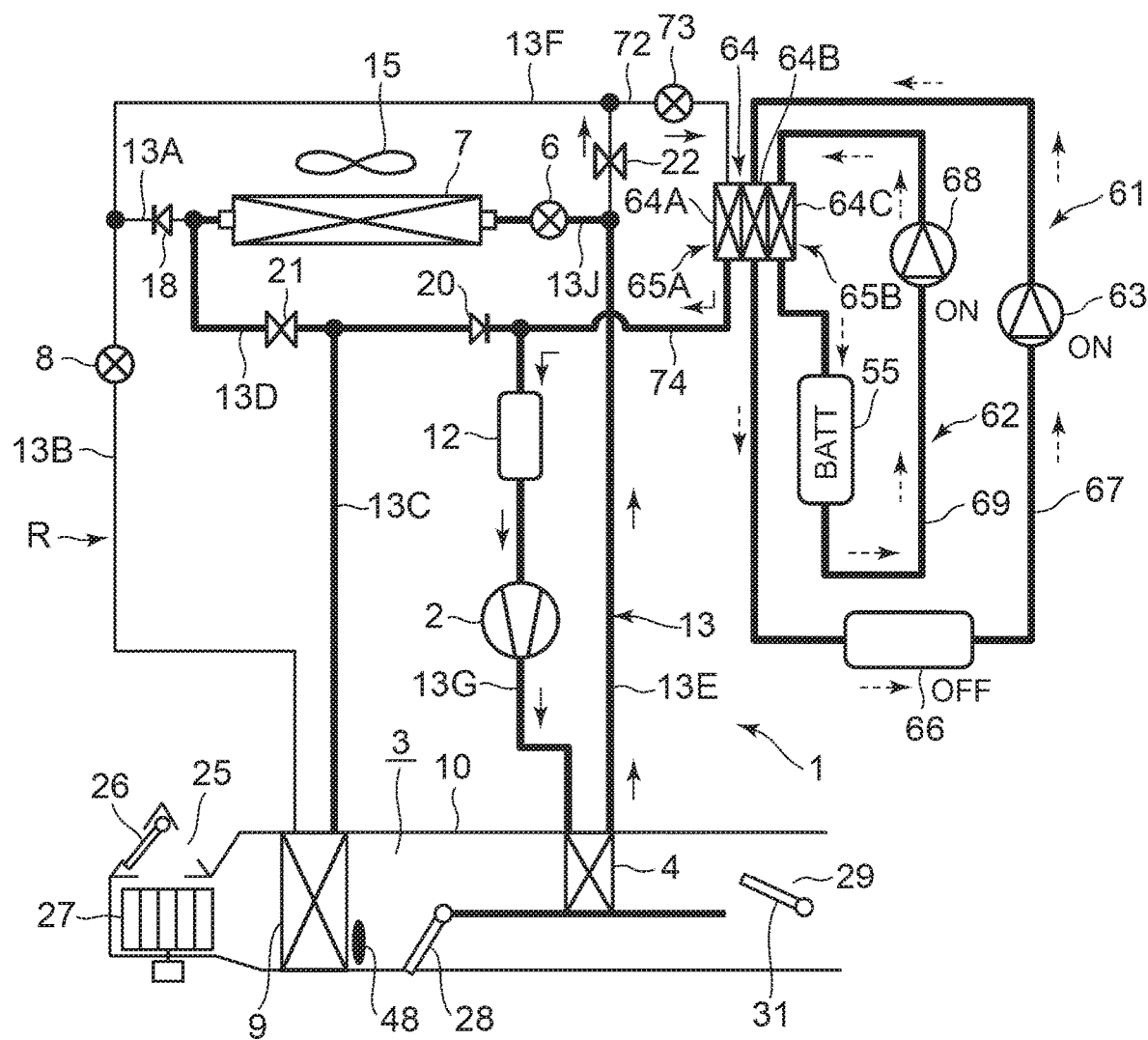
FIG. 10 is a diagram describing a battery cooling operation to be executed by the controller of FIG. 2.

In consequence, a part of the refrigerant flowing out from the radiator 4 and flowing through the refrigerant circuit 13E is distributed to the refrigerant pipe 13F as indicated by solid line arrows in FIG. 9, and the residual refrigerant is decompressed in the outdoor expansion valve 6 and then flows into the outdoor heat exchanger 7 to evaporate and absorb heat from the outdoor air. The refrigerant distributed to the refrigerant pipe 13F is decompressed in the auxiliary expansion valve 73, and then flows into the refrigerant flow passage 64A of the three medium heat exchanger 64 to evaporate therein. This refrigerant absorbs heat from the first heat medium flowing through the first heat medium flow passage 64B in the process of flowing through the refrigerant flow passage 64A, and then flows through the accumulator 12 to be sucked into the compressor 2.

On the other hand, the first heat medium in the first heat medium circulating device 61 flows through the first heat medium flow passage 64B of the three medium heat exchanger 64 as indicated by broken line arrows in FIG. 9 and is then heated in the heat medium heating heater 66, followed by being sucked in the circulating pump 63. The second heat medium in the second heat medium circulating device 62 also flows through the second heat medium flow passage 64C of the three medium heat exchanger 64 as indicated by broken line arrows in the same figure and then flows through the battery 55 to be sucked into the circulating pump 68.

In the three medium heat exchanger 64, the refrigerant flowing through the refrigerant flow passage 64A absorbs heat from the first heat medium flowing through the first heat medium flow passage 64B. The first heat medium flowing through the first heat medium flow passage 64B absorbs heat from the second heat medium flowing through the second heat medium flow passage 64C. Then, the second heat medium flowing out from the second heat medium flow passage 64C flows through the battery 55 to perform heat exchange, thereby absorbing heat from the battery 55, whereby the battery 55 is conversely cooled by the second heat medium.

In the battery waste heat recovering operation at the time that the above-described heating assistance operation of FIG. 8 is performed, the controller 32 controls energization of the heat medium heating heater 66 by using the following equation (V), for example.

$$Q_{ech} = (Q_{tgt} - Q_{hp}) - (T_b - T_{out1}) \times k_1 \times k_2 \quad (V)$$

where, k1 is a specific heat of the first heat medium circulated in the first heat medium circulating device 61 [kj/kg·K], and k2 is a flow rate of the first heat medium [m³/h]. These are assumed to be similar even in the second heat medium circulating device 62. Incidentally, it is to be noted that heat exchange efficiency and other factors in the respective heat medium heat exchanging units 65A and 65B are also considered actually.

Thus, in the battery waste heat recovering operation, the controller 32 controls energization of the heat medium heating heater 66 so as to generate an amount of heat obtained by subtracting an amount of heat corresponding to the heating of the first heat medium by the battery 55 through the second heat medium from the amount of heat pumped up by the refrigerant evaporated in the first heat medium flow passage 64B of the three medium heat exchanger 64. That is, the waste heat of the battery 55 is also transferred to the three medium heat exchanger 64 by the first and second heat mediums, pumped by the refrigerant, and contributes to the heating of the vehicle interior. The amount of heat generation of the heat medium heating heater 66 is reduced by the waste heat of the battery 55 to bring about saving energy.

Incidentally, in the battery waste heat recovering operation during execution of the heating operation of FIG. 3 in which the heating capability Qhp generable by the radiator 4 satisfies the required heating capability Qtgt (Qtg≤Qhp), the controller 32 stops the energization of the heat medium heating heater 66 regardless of the above equation (V) while operating the circulating pumps 63 and 68 (OFF). That is, only the waste heat of the battery 55 is used to perform heating assistance by the radiator 4, thereby achieving the most energy saving state.

As described above, when the waste heat of the battery 55 can be recovered, the controller 32 lets the refrigerant discharged from the compressor 2 radiate heat in the radiator 4. decompresses the radiated refrigerant, and then let the refrigerant absorb heat in the outdoor heat exchanger 7 and the refrigerant flow passage 64A (the first heat medium heat exchanging unit 65A). Further, the controller circulates the first heat medium in the first heat medium circulating device 61 and circulates the second heat medium in the second heat medium circulating device 62. It is therefore possible to cause the refrigerant to pump up the waste heat of the battery 55 through the second heat medium and the first heat medium sequentially and efficiently perform heating air conditioning of the vehicle interior by effectively utilizing the waste heat of the battery 55. Further, the temperature rise of the battery 55 can be suppressed as well, and frost formation on the outdoor heat exchanger 7 can also be suppressed.

Even in this case, in the embodiment, when the battery temperature Tb is higher than the predetermined value Tout1 of the temperature (the outlet heat medium temperature Tout) of the first heat medium on the outlet side of the first heat medium flow passage 64B (the first heat medium heat exchanging unit 65A), which becomes the criterion for determining whether or not the waste heat can be recovered from the battery 55, the controller 32 determines the waste heat of the battery 55 to be recoverable. It is therefore possible to accurately determine that the waste heat of the battery 55 can be recovered, and thereby control the operation of each of the heat medium circulating devices 61 and 62. Incidentally, when the battery temperature Tb becomes less than the predetermined value Tout1, the controller 32 performs the heating assistance operation of energizing the heat medium heating heater 66 by the above equation (IV) again or is reset to the heating operation of FIG. 3.

(7-3) Battery Heating Operation

Next, the battery heating operation performed by the controller 32 will be described. When the battery temperature Tb detected by the battery temperature sensor 76 is lower than the operating lower limit temperature TL (Tb<TL), the controller 32 determines that the battery 55 needs to be heated and thereby operates the circulating pumps 63 and 68 of the first heat medium circulating device 61 and the second heat medium circulating device 62 (ON), and energizes the heat medium heating heater 66 to generate heat (ON).

Consequently, the first heat medium in the first heat medium circulating device 61 flows through the first heat medium flow passage 64B of the three medium heat exchanger 64 as indicated by the broken line arrows in FIG. 9 as with the case of the battery waste heat recovering operation described above, and is then heated by the heat medium heating heater 66, followed by being sucked into the circulating pump 63. Further, the second heat medium in the second heat medium circulating device 62 also flows through the second heat medium flow passage 64C of the three medium heat exchanger 64 as indicated by the broken ling arrows in the same figure and then flows through the battery 55 to be sucked into the circulating pump 68.

In the three medium heat exchanger 64, the refrigerant flowing through the refrigerant flow passage 64A absorbs heat from the first heat medium flowing through the first heat medium flow passage 64B, and the second heat medium flowing through the second heat medium flow passage 64C also absorbs heat from the first heat medium flowing through the first heat medium flow passage 64B. Then, the second heat medium flowing out from the second heat medium flow passage 64C flows into the battery 55 to exchange heat, thereby heating the battery 55.

In the battery heating operation when the heating assistance operation of FIG. 8 described above is performed, the controller 32 controls the energization of the heat medium heating heater 66 by using the following equation (VI), for example.

$$Q_{ech} = (Q_{tgt} - Q_{hp}) + (TL - Tb) \times k1 \times k2 \quad (VI)$$

where, similarly, k1 is a specific heat [kj/kg·K] of the first heat medium circulated in the first heat medium circulating device 61, and k2 is a flow rate of the first heat medium [m³/h]. These are assumed to be similar even in terms of the second heat medium circulating device 62. Incidentally, even in this case, heat exchange efficiency and other factors in the respective heat medium heat exchanging units 65A and 65B are also assumed to be actually considered. In other words, in the battery heating operation, the controller 32 controls energization of the heat medium heating heater 66 so as to generate the amount of heat for raising the temperature of the battery 55 to the operating lower limit temperature TL in addition to the amount of heat pumped up by the refrigerant evaporated in the refrigerant flow passage 64A when the first heat medium flows through the first heat medium flow passage 64B of the three medium heat exchanger 64.

Incidentally, when performing the heating operation of FIG. 3 in which the heating capacity Qhp that can be generated by the radiator 4 satisfies the required heating capacity Qtgt (Qtgt≤Qhp), and in the operation other than the heating assistance operation and the heating operation, or the battery heating operation when the compressor 2 is stopped, the controller 32 controls energization of the heat medium heating heater 66 by using the following equation (VII) regardless of the above equation (VI).

$$Q_{ech} = (TL - Tb) \times k1 \times k2 \quad (VII)$$

where, similarly, k1 is a specific heat [kj/kg·K] of the first heat medium circulated in the first heat medium circulating device 61, and k2 is a flow rate of the first heat medium [m³/h]. The same applies even to the second heat medium circulating device 62 in terms of these. Incidentally, even in this case, heat exchange efficiency and other factors in the respective heat medium heat exchanging units 65A and 65B are also assumed to be actually considered. That is, the heat generation amount is set to a state of being generated only for heating the battery 55.

Thus, when the battery 55 needs to be heated, the controller 32 heats the first heat medium by the heat medium heating heater 66 to circulate the first heat medium in the first heat medium circulating device 61 and circulate the second heat medium in the second heat medium circulating device 62. It is therefore possible to heat the second heat medium by the first heat medium heated by the heat medium heating heater 66 and to heat the battery 55 by the so-heated second heat medium without hindrance.

Even in this case, in the embodiment, the controller 32 determines that the battery 55 needs to be heated when the temperature of the battery 55 is lower than the operating lower limit temperature TL. It is therefore possible to accurately determine that the battery 55 needs to be heated and control the operation of each of the heat medium circulating devices 61 and 62.

Incidentally, when the battery temperature Tb becomes greater than or equal to the operating lower limit temperature TL, the controller 32 ends the battery heating operation and returns to the other operation (heating operation, heating assistance operation, etc.) described above, or stops the energization of the heat medium heating heater 66 and the operations of the compressor 2 and the circulating pumps 63 and 68.

(7-4) Battery Cooling Operation

Here, when the battery temperature Tb suddenly rises due to charging/discharging of the battery 55 and becomes higher than the operating upper limit temperature (TH<Tb), the controller 32 determines that it is necessary to cool the battery 55 and performs the battery cooling operation. Next, the battery cooling operation will be described using FIG. 10.

In this battery cooling operation, the controller 32 fully closes the outdoor expansion valve 6 and the indoor expansion valve 8 (fully closed position), opens the solenoid valve 22, and opens the auxiliary expansion valve 73 to set the refrigerant to its decompression controlled state. Then, the controller 32 operates the compressor 2. Further, the controller 32 operates the circulating pumps 63 and 68 of the heat medium circulating devices 61 and 62 (ON), and stops the heating of the heat medium by the heat medium heating heater 66 (OFF).

Thus, the refrigerant discharged from the compressor 2 radiates heat in the radiator 4, and all the refrigerant radiated in the radiator 4 is decompressed by the auxiliary expansion valve 73, and enters the refrigerant flow passage 64A of the three medium heat exchanger 64 to evaporate. Also, the first heat medium discharged from the circulating pump 62 flows into the first heat medium flow passage 64B, where it absorbs heat from the refrigerant and is cooled, and then passes without being heated by the heat medium heating heater 66 to be sucked into the circulating pump 63. Further, the second heat medium discharged from the circulating pump 68 flows into the second heat medium flow passage 64C, where it absorbs heat from the first heat medium and is cooled, and then flows into the battery 55. The second heat medium absorbs heat from the battery 55 and is cooled.

In this battery cooling operation, the controller 32 calculates, based on the temperature (the battery temperature Tb) of the battery 55 detected by the battery temperature sensor 76 and the above-described operating upper limit temperature TH, a required battery cooling capability Qbat being the cooling capability of the battery 55 required for the second heat medium circulating device 62 by using the following equation (VIII), for example.

$$Qbat=(Tb-TH) \times k1 \times k2 \qquad \text{(VIII)}$$

where, similarly, k1 is a specific heat [kj/kg·K] of the first heat medium circulated in the first heat medium circulating device 61, and k2 is a flow rate of the first heat medium [m³/h]. In terms of these, the same applies even to the second heat medium circulating device 62. Incidentally, even in this case, the heat exchange efficiency and other factors in the respective heat medium heat exchanging units 65A and 65B are assumed to be actually considered. Then, the compressor 2 and the auxiliary expansion valve 73 are controlled so as to achieve the required battery cooling capability Qbat.

Consequently, the battery temperature Tb is quickly lowered. Incidentally, in this battery cooling operation, when the battery temperature Tb is lowered to the operating upper limit temperature TH or below, the controller 32 ends the battery cooling operation and returns to other operation (heating operation, heating assistance operation, etc.) Alternatively, the controller stops the compressor 2 and the circulation pumps 63 and 68.

As described above, when the battery 55 needs to be cooled, the controller 32 causes the refrigerant discharged from the compressor 2 to radiate heat in the radiator 4 and decompresses the radiated refrigerant, and then causes the refrigerant to absorb heat in the refrigerant flow passage 64A (the first heat medium heat exchanging unit 65A). Further, in a state in which heating of the first heat medium by the heat medium heating heater 66 is stopped, the controller circulates the first heat medium in the first heat medium circulating device 61, and circulates the second heat medium in the second heat medium circulating device 62. Therefore, the battery 55 can be cooled without hindrance by the second heat medium cooled by heat exchange with the first heat medium cooled by the refrigerant.

Even in this case, in the embodiment, since the controller 32 determines that the battery 55 needs to be cooled when the battery temperature Tb is higher than the operating upper limit temperature TH, it is possible to accurately determine that the battery 55 needs to be cooled and control the operation of each of the heat medium circulating devices 61 and 62.

In the present invention, as described above in detail, the first heat medium circulating device 61 which circulates the first heat medium in the heat medium heating heater 66 for heating the first heat medium, and the second heat medium circulating device 62 which circulates the second heat medium in the battery 55 are provided. The first heat medium heat exchanging unit 65A (the first heat medium flow passage 64B) for performing exchange of heat between the refrigerant and the first heat medium is provided in the first heat medium circulating device 61, and the second heat medium heat exchanging unit 65B (the second heat medium flow passage 64C) for performing exchange of heat between the first heat medium and the second heat medium is provided in the second heat medium circulating device 62. Therefore, an efficient air-conditioning operation can be realized without being affected by the temperature of the battery 55 by switching between the state in which the second heat medium is circulated in the second heat medium circulating device 62 and the state in which the second heat medium is not circulated.

In particular, since the second heat medium and the refrigerant circulated to the battery 55 are heat-exchanged via the first heat medium heated by the heat medium heating heater 66, the influence of the temperature of the battery 55 can be accurately eliminated or controlled. Further, in the embodiment, since the controller 32 controls the operations of the heat medium circulating devices 61 and 62 based on the battery temperature Tb, the heat medium circulating devices 61 and 62 can be appropriately controlled according to the state of the temperature of the battery 55.

Further, in the embodiment, the three medium heat exchanger 64 in which the first heat medium heat exchanging unit 65A and the second heat medium heat exchanging unit 65B are integrated is provided. Therefore, the vehicle air-conditioning device 1 can be arranged without any trouble even in the limited installation space of the engine room (even if the engine is not mounted, space in which the vehicle air-conditioning device 1 and other equipment are installed is called the engine room) of the vehicle.

The configurations of the refrigerant circuit R and the heat medium circulating devices 61 and 62 described in the above embodiment, the numerical values such as the temperatures, and the control factors are not limited thereto and needless to say, can be changed in the scope not departing from the spirit of the present invention.

DESCRIPTION OF REFERENCE NUMERALS 1 vehicle air-conditioning device
2 compressor
3 air flow passage
4 radiator
6 outdoor expansion valve
7 outdoor heat exchanger
8 indoor expansion valve 9 heat absorber
21, 22 solenoid valve
32 controller (control device)
55 battery (heat generating device)
61 first heat medium circulating device
62 second heat medium circulating device
63, 68 circulating pump
64 three medium heat exchanger
64A refrigerant flow passage
64B first heat medium flow passage
64C second heat medium flow passage
65A first heat medium heat exchanging unit
63B second heat medium heat exchanging unit
66 heat medium heating heater (heating device)
73 auxiliary expansion valve
R refrigerant circuit

The invention claimed is:

1. A vehicle air-conditioning device which conditions air of a vehicle interior, comprising:
a compressor to compress a refrigerant;
an air flow passage through which the air to be supplied to the vehicle interior flows;
a radiator to let the refrigerant radiate heat, thereby heating the air to be supplied from the air flow passage to the vehicle interior;
an outdoor heat exchanger provided outside the vehicle interior to let the refrigerant absorb heat; and
a control device,
wherein the vehicle air-conditioning device includes a first heat medium circulating device to let a first heat medium circulate in a heating device for heating the first heat medium, and
a second heat medium circulating device to let a second heat medium circulate in a heat generating device mounted on a vehicle,
wherein the first heat medium circulating device has a first heat medium heat exchanging unit to let heat exchange between the refrigerant and the first heat medium; and
wherein the second heat medium circulating device has a second heat medium heat exchanging unit to let heat exchange between the first heat medium and the second heat medium.

2. The vehicle air-conditioning device according to claim 1, wherein the vehicle air-conditioning device includes a three medium heat exchanger in which the first heat medium heat exchanging unit and the second heat medium heat exchanging unit are integrated.

3. The vehicle air-conditioning device according to claim 2, wherein the control device controls the respective heat medium circulating devices on the basis of the temperature of the heat generating device.

4. The vehicle air-conditioning device according to claim 2, wherein the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and heats the first heat medium by the heating device to circulate the first heat medium in the first heat medium circulating device, and
wherein when the heat generating device needs not to be heated, the control device stops circulation of the second heat medium in the second heat medium circulating device.

5. The vehicle air-conditioning device according to claim 1, wherein the control device controls the respective heat medium circulating devices on the basis of the temperature of the heat generating device.

6. The vehicle air-conditioning device according to claim 5, wherein the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and heats the first heat medium by the heating device to circulate the first heat medium in the first heat medium circulating device, and
wherein when the heat generating device needs not to be heated, the control device stops circulation of the second heat medium in the second heat medium circulating device.

7. The vehicle air-conditioning device according to claim 1, wherein the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and heats the first heat medium by the heating device to circulate the first heat medium in the first heat medium circulating device, and
wherein when the heat generating device needs not to be heated, the control device stops circulation of the second heat medium in the second heat medium circulating device.

8. The vehicle air-conditioning device according to claim 7, wherein when the temperature of the heat generating device is greater than or equal to a predetermined operating lower limit temperature, the control device determines that the heat generating device needs not to be heated.

9. The vehicle air-conditioning device according to claim 7, wherein when it is possible to recover waste heat of the heat generating device, the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and
wherein the control device lets the first heat medium circulate in the first heat medium circulating device and lets the second heat medium circulate in the second heat medium circulating device.

10. The vehicle air-conditioning device according to claim 7, wherein when the heat generating device needs to be heated, the control device heats the first heat medium by the heating device to circulate the first heat medium in the first heat medium circulating device, and circulate the second heat medium in the second heat medium circulating device.

11. The vehicle air-conditioning device according to claim 4, wherein when the heat generating device needs to be cooled, the control device lets the refrigerant discharged from the compressor radiate heat in the radiator, decompresses the refrigerant from which the heat has been radiated, and then lets the refrigerant absorb heat in the first heat medium heat exchanging unit, and
wherein in a state in which the heating of the first heat medium by the heating device is stopped, the control device lets the first heat medium circulate in the first heat medium circulating device and lets the second heat medium circulate in the second heat medium circulating device.

12. The vehicle air-conditioning device according to claim 1, wherein when it is possible to recover waste heat of the heat generating device, the control device lets the refrigerant discharged from the compressor radiate heat in the radiator, decompresses the refrigerant from which the heat has been radiated, and then lets the refrigerant absorb heat in the outdoor heat exchanger and the first heat medium heat exchanging unit, and wherein the control device lets the first heat medium circulate in the first heat medium circulating device and lets the second heat medium circulate in the second heat medium circulating device.

13. The vehicle air-conditioning device according to claim 12, wherein when the temperature of the heat generating device is higher than a predetermined value of the temperature of the first heat medium on the outlet side of the first heat medium heat exchanging unit, which becomes a criterion for determining whether or not the waste heat of the heat generating device is recoverable, the control device determines the waste heat of the heat generating device to be recoverable.

14. The vehicle air-conditioning device according to claim 13, wherein when the heat generating device needs to be cooled, the control device lets the refrigerant discharged from the compressor radiate heat in the radiator, decompresses the refrigerant from which the heat has been radiated, and then lets the refrigerant absorb heat in the first heat medium heat exchanging unit, and wherein in a state in which the heating of the first heat medium by the heating device is stopped, the control device lets the first heat medium circulate in the first heat medium circulating device and lets the second heat medium circulate in the second heat medium circulating device.

15. The vehicle air-conditioning device according to claim 12, wherein when the heat generating device needs to be heated, the control device heats the first heat medium by the heating device to circulate the first heat medium in the first heat medium circulating device, and circulate the second heat medium in the second heat medium circulating device.

16. The vehicle air-conditioning device according to claim 12, wherein when the heat generating device needs to be cooled, the control device lets the refrigerant discharged from the compressor radiate heat in the radiator, decompresses the refrigerant from which the heat has been radiated, and then lets the refrigerant absorb heat in the first heat medium heat exchanging unit, and wherein in a state in which the heating of the first heat medium by the heating device is stopped, the control device lets the first heat medium circulate in the first heat medium circulating device and lets the second heat medium circulate in the second heat medium circulating device.

17. The vehicle air-conditioning device according to claim 1, wherein when the heat generating device needs to be heated, the control device heats the first heat medium by the heating device to circulate the first heat medium in the first heat medium circulating device, and circulate the second heat medium in the second heat medium circulating device.

18. The vehicle air-conditioning device according to claim 17, wherein when the temperature of the heat generating device is lower than a predetermined operating lower limit temperature, the control device determines that the heat generating device needs to be heated.

19. The vehicle air-conditioning device according to claim 1, wherein when the heat generating device needs to be cooled, the control device lets the refrigerant discharged from the compressor radiate heat in the radiator, decompresses the refrigerant from which the heat has been radiated, and then lets the refrigerant absorb heat in the first heat medium heat exchanging unit, and wherein in a state in which the heating of the first heat medium by the heating device is stopped, the control device lets the first heat medium circulate in the first heat medium circulating device and lets the second heat medium circulate in the second heat medium circulating device.

20. The vehicle air-conditioning device according to claim 19, wherein when the temperature of the heat generating device is higher than a predetermined operating upper limit temperature, the control device determines that the heat generating device needs to be cooled.

* * * * *